US010418891B2

(12) United States Patent
Takahashi et al.

(10) Patent No.: US 10,418,891 B2
(45) Date of Patent: Sep. 17, 2019

(54) WIRELESS POWER TRANSMISSION SYSTEM

(71) Applicant: Panasonic Intellectual Property Management Co., Ltd., Osaka (JP)

(72) Inventors: Eiji Takahashi, Nara (JP); Hiroshi Kanno, Osaka (JP); Tsutomu Sakata, Osaka (JP); Satoru Kikuchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 129 days.

(21) Appl. No.: 15/259,222

(22) Filed: Sep. 8, 2016

(65) Prior Publication Data

US 2017/0098991 A1  Apr. 6, 2017

Related U.S. Application Data

(60) Provisional application No. 62/236,306, filed on Oct. 2, 2015.

(30) Foreign Application Priority Data

Nov. 30, 2015  (JP) ................. 2015-233600

(51) Int. Cl.
*H01F 27/42*  (2006.01)
*H01F 37/00*  (2006.01)
(Continued)

(52) U.S. Cl.
CPC .......... *H02M 1/08* (2013.01); *B25J 19/0045* (2013.01); *H02J 50/12* (2016.02); *H02J 50/80* (2016.02);
(Continued)

(58) Field of Classification Search
CPC .......... H02J 50/12; H02J 50/80; H02M 7/537; H02M 1/08; H02M 7/04; H04B 5/0037
See application file for complete search history.

(56) References Cited

U.S. PATENT DOCUMENTS

| 2009/0096413 A1* | 4/2009 | Partovi | ................ | H01F 5/003 |
| | | | | 320/108 |
| 2012/0235636 A1* | 9/2012 | Partovi | ................ | H02J 7/025 |
| | | | | 320/108 |

(Continued)

FOREIGN PATENT DOCUMENTS

| EP | 2833509 A1 | 2/2015 |
| JP | 2007-336717 | 12/2007 |

(Continued)

OTHER PUBLICATIONS

The Extended European Search Report dated Mar. 16, 2017 for the related European Patent Application No. 16189412.6.

*Primary Examiner* — Rexford N Barnie
*Assistant Examiner* — Rasem Mourad
(74) *Attorney, Agent, or Firm* — Renner, Otto, Boisselle & Sklar, LLP

(57) ABSTRACT

A wireless power transmission system includes a power transmitting device, power receiving device, and load. The power transmitting device includes an inverter circuit, power transmitting antenna, power transmission control circuit, and transmitting-side receiver. The power receiving device includes a power receiving antenna, rectifying circuit, and receiving-side transmitter. The power transmission control circuit causes the inverter circuit to output preliminary AC power to activate the power receiving device. The receiving-side transmitter transmits, to the power transmitting device, control information of the power receiving device including (i) a coupling coefficient between the power transmitting antenna and the power receiving (Continued)

antenna, (ii) requested voltage of the power receiving device, and (iii) load impedance of the load. The power transmission control circuit determines the control parameter based on the control information by referring to the table, based on the control information, and adjusts the voltage and frequency of the AC power output from the inverter circuit using the control parameter.

12 Claims, 28 Drawing Sheets

(51) Int. Cl.
| | | |
|---|---|---|
| | *H01F 38/00* | (2006.01) |
| | *H02M 1/08* | (2006.01) |
| | *H04B 5/00* | (2006.01) |
| | *H02J 50/12* | (2016.01) |
| | *B25J 19/00* | (2006.01) |
| | *H02M 7/04* | (2006.01) |
| | *H02M 7/537* | (2006.01) |
| | *H02J 50/80* | (2016.01) |

(52) U.S. Cl.
CPC .............. *H02M 7/04* (2013.01); *H02M 7/537* (2013.01); *H04B 5/0037* (2013.01)

(56) References Cited

U.S. PATENT DOCUMENTS

| | | | |
|---|---|---|---|
| 2012/0306285 A1* | 12/2012 | Kim | H02J 17/00 307/104 |
| 2012/0306286 A1 | 12/2012 | Kim et al. | |
| 2015/0028691 A1* | 1/2015 | Yamauchi | H02J 5/005 307/104 |
| 2015/0048688 A1* | 2/2015 | Yamakawa | H02J 7/02 307/104 |
| 2015/0310722 A1* | 10/2015 | Sousa | H02J 50/12 307/104 |
| 2015/0364947 A1* | 12/2015 | Murayama | H02J 5/005 320/108 |
| 2016/0020634 A1* | 1/2016 | Kanno | H02J 17/00 320/108 |
| 2016/0079798 A1* | 3/2016 | Jeong | H02J 50/40 320/108 |
| 2016/0099614 A1* | 4/2016 | Leabman | H01Q 1/243 307/104 |
| 2016/0134334 A1* | 5/2016 | Park | H02J 5/005 307/104 |
| 2016/0181821 A1* | 6/2016 | Xu | H01F 27/24 307/104 |

FOREIGN PATENT DOCUMENTS

| | | |
|---|---|---|
| WO | 2014/042681 A2 | 3/2014 |
| WO | 2015/015771 A1 | 2/2015 |

* cited by examiner

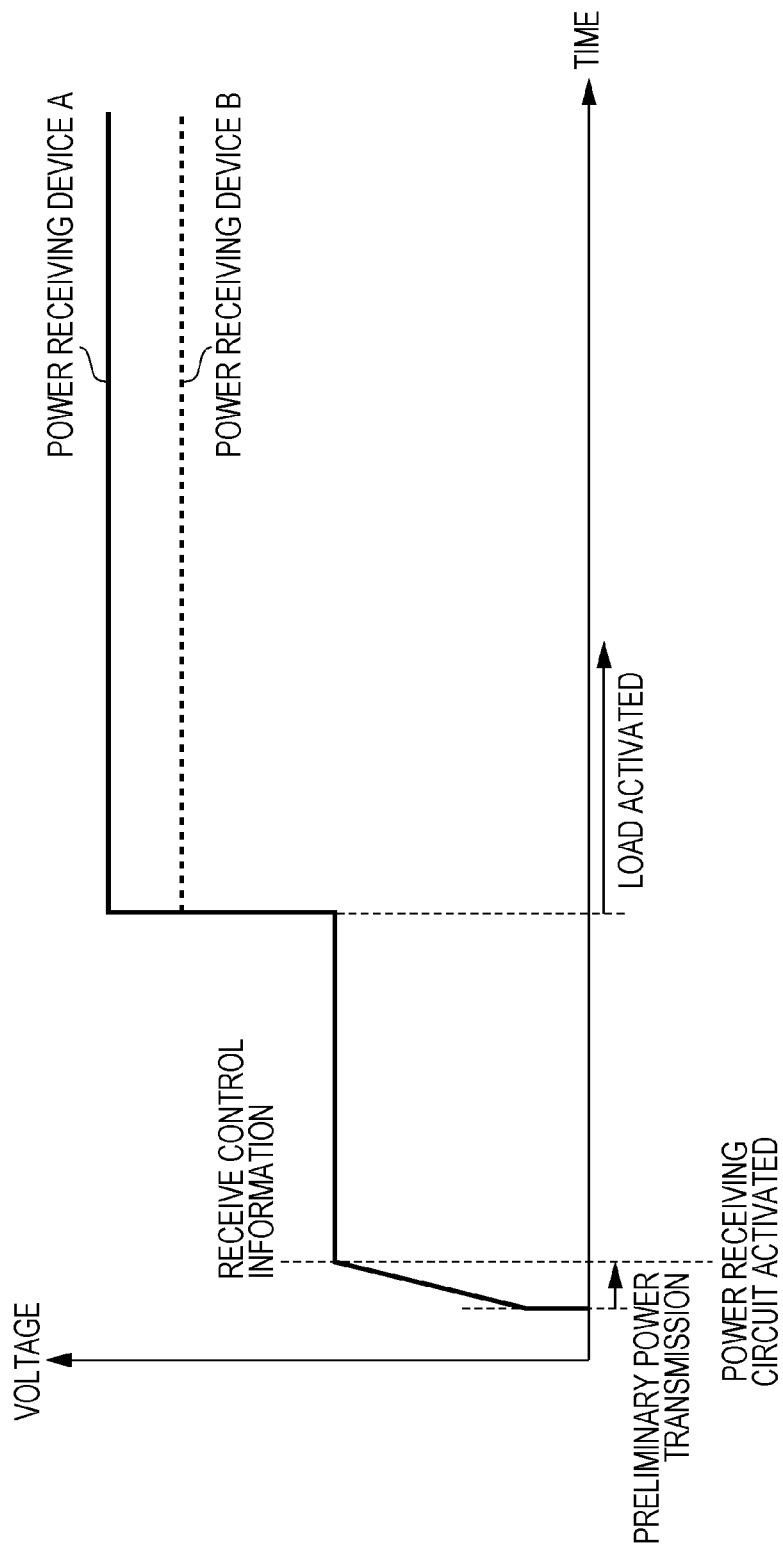

FIG. 16

| COUPLING COEFFICIENT 0.7 | VOLTAGE (V) | | | | | |
|---|---|---|---|---|---|---|
| LOAD IMPEDANCE (Ω) | 3 | 5 | 10 | 15 | 20 | ... |
| 1 | 170 | 140 | 122 | 108 | 98 | ... |
| 5 | 160 | 135 | 117 | 113 | 94 | ... |
| ... | ... | ... | ... | ... | ... | ... |
| 30 | 140 | 126 | 106 | 95 | 85 | ... |
| 40 | 135 | 120 | 100 | 90 | NA | NA |
| ... | ... | ... | ... | NA | NA | NA |

(VALUES IN TABLE ARE IN UNITS OF kHz)

WIRELESS POWER TRANSMISSION SYSTEM

BACKGROUND

1. Technical Field

The present disclosure relates to a wireless power transmission system that transmits electric power wirelessly.

2. Description of the Related Art

In recent years, there has been advance in development of wireless (non-contact) power transmission technology, where electric power is transmitted wirelessly (non-contact) to devices that move, such as cellular phones, electric vehicles, and so forth. For example, Japanese Unexamined Patent Application Publication No. 2007-336717 discloses a wireless power transmission system in which the voltage of power wirelessly transmitted can be controlled to a constant level after rectification. The conventional art has had a problem, though, in that when interchangeably using two or more power receiving devices with one power transmitting device, a long time is required for the load to be activated.

SUMMARY

In one general aspect, the techniques disclosed here feature a wireless power transmission system including:
a power transmitting device including
an inverter circuit that converts a first DC power supplied from a power source into AC power and outputs the AC power,
a power transmitting antenna that wirelessly transmits the output AC power, and
a power transmission control circuit that adjusts the voltage and frequency of the AC power output from the inverter circuit;
a power receiving device including
a power receiving antenna that receives the AC power transmitted from the power transmitting antenna, and
a rectifying circuit that converts the received AC power into a second DC power; and
a load into which the second DC power is input,
wherein the power transmitting device and the power receiving device are capable of being coupled and detached,
wherein the power receiving device further includes a receiving-side transmitter that transmits, to the power transmitting device, control information of the power receiving device including (i) a coupling coefficient between the power transmitting antenna and the power receiving antenna, (ii) requested voltage of the power receiving device, and (iii) load impedance of the load,
wherein the power transmitting device further includes
a transmitting-side receiver that receives the control information of the power receiving device from the receiving-side transmitter, and
a table containing control parameters correlated with (i) the coupling coefficient, (ii) the requested voltage, and (iii) the load impedance,
and wherein the power transmission control circuit
causes the inverter circuit to output preliminary AC power to activate the power receiving device in a state where the power transmitting device and power receiving device are coupled,
causes the transmitting-side receiver to receive the control information of the power receiving device from the power receiving device,
determines the control parameter based on the control information by referring to the table, and
adjusts the voltage of the AC power output from the inverter circuit using the control parameter.

According to an embodiment of the present disclosure, the activation time of the load can be reduced when interchangeably using two or more power receiving devices with one power transmitting device.

It should be noted that general or specific embodiments may be implemented as a system, a device, a method, an integrated circuit, a computer program, a storage medium, or may be implemented as any selective combination of a system, a method, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 13 is a diagram illustrating an example of temporal change of voltage supplied to a load in the first embodiment;

FIG. 16 is a diagram illustrating an example of tables stored in transmitting side memory;

DETAILED DESCRIPTION (Underlying Knowledge Forming Basis of the Present Disclosure)

Figure 1:
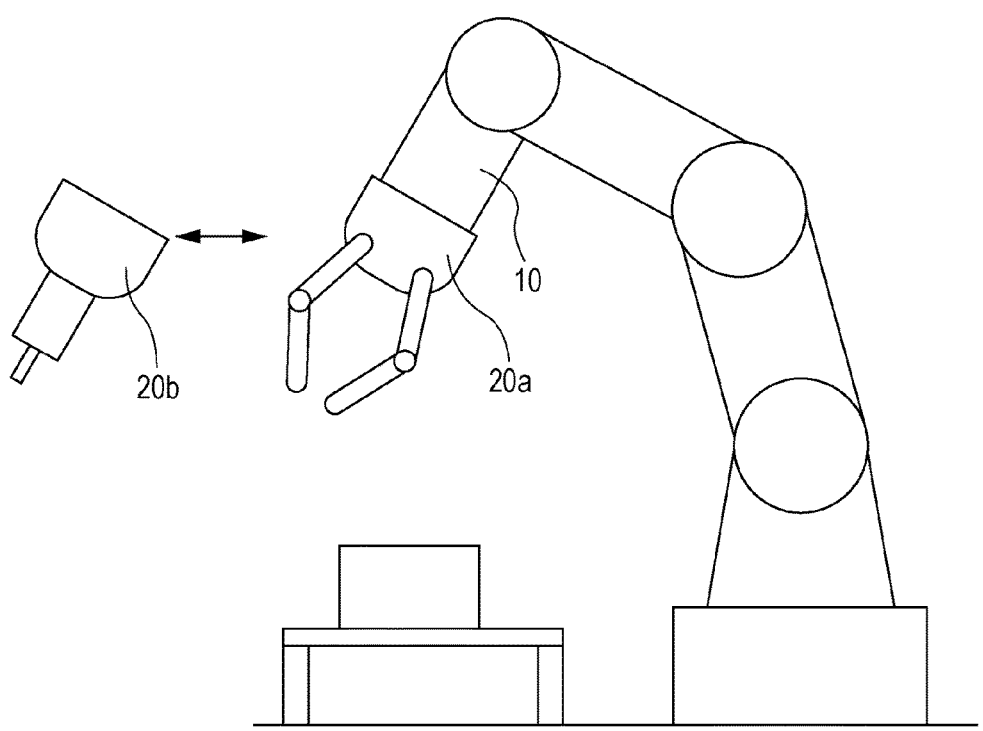
FIG. 1 is a diagram schematically illustrating an example of a wireless power transmission system.

The present inventors have been developing a wireless power transmission system where multiple power receiving devices can be interchangeably used as to one power transmitting device. FIG. 1 is a diagram schematically illustrating an example of such a wireless power transmission system. An example of a wireless power transmission system that has been applied to a transporting robot arm used in a factory, for example, is illustrated in FIG. 1. The wireless power transmission system includes a power transmitting device 10 and a power receiving device 20a. The power receiving device 20a is exchangeable with another power receiving device 20b. The power receiving devices 20a and 20b are robot hands in which are installed loads such as motors or the like. The power transmitting device 10 has a power transmitting antenna coil including a power transmitting coil, and the power receiving device 20a has a power receiving antenna including a power receiving coil. Electric power is transmitted without contact from the power transmitting antenna to the power receiving antenna. The power receiving device 20a supplies the electric power received from the power transmitting device 10 to the load such as a motor.

The hand can be exchanged in accordance with the work being performed in this wireless power transmission system. Attaching another power receiving device 20b to the power transmitting device 10 instead of the power receiving device 20a enables work to be performed that is different from that performed by the power receiving device 20a.

Now, it is important that operation after exchanging the power receiving device can be quickly started in the wireless power transmission system where power receiving devices can be exchanged, in order to improve work efficiency. However, the present inventors have found through study that applying conventional control results in the activation time of the load after exchanging the power receiving device becoming long.

Conventional wireless power transmission systems include systems where the DC voltage supplied to the load is maintained at a constant level by performing feedback control, such as disclosed in Japanese Unexamined Patent Application Publication No. 2007-336717 for example. In this sort of system, the power receiving device rectifies the AC power received from the power transmitting device, generates feedback signals based on DC voltage detection values after rectification, and transmits the feedback signals to the power transmitting device. The power transmitting device increases or decreases the AC power to be supplied to the power transmitting coil in accordance with these feedback signals. Accordingly, the voltage value of the DC power supplied from the power receiving device to the load is controlled to a generally constant level.

Figure 2:
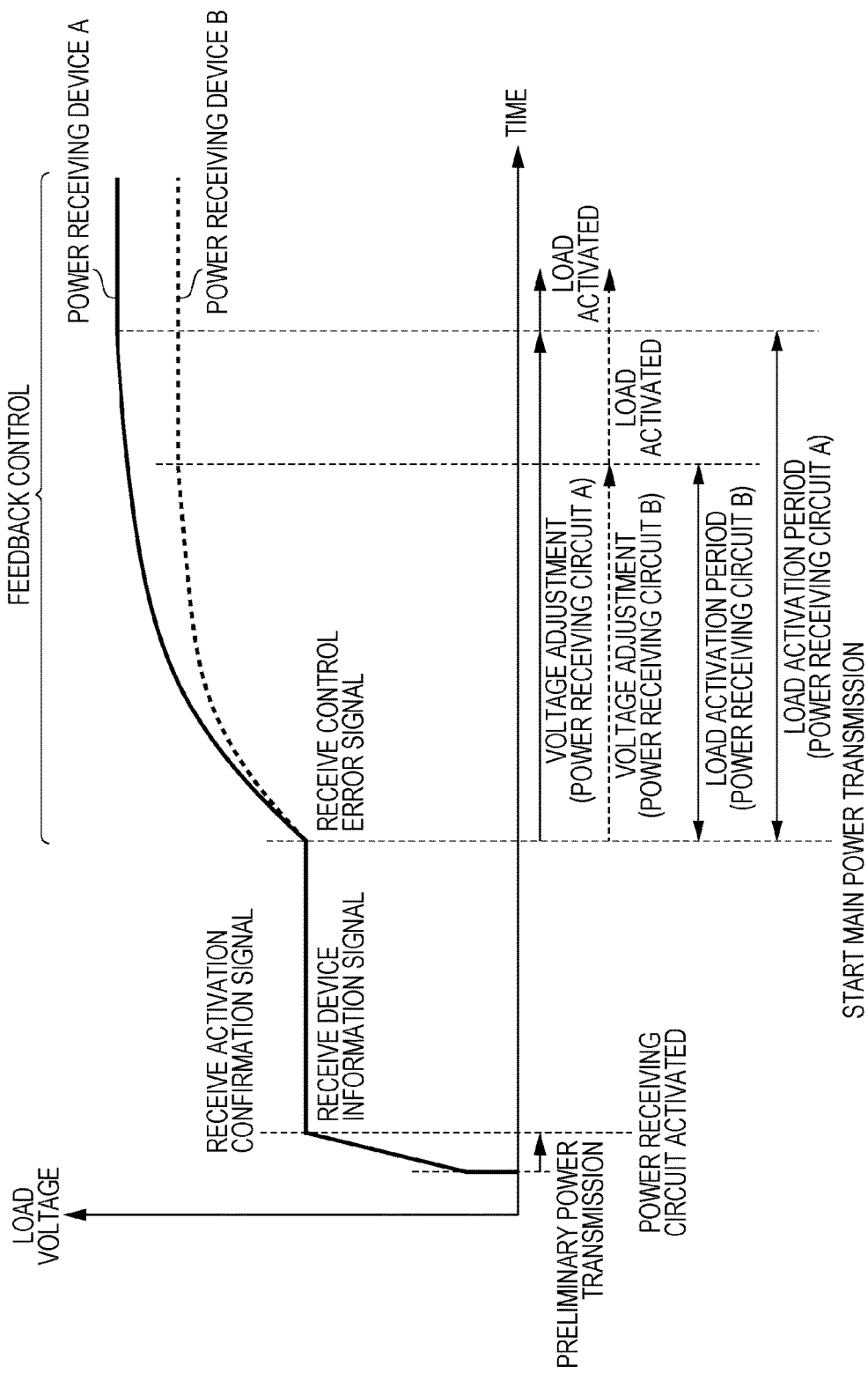
FIG. 2 is a diagram illustrating an example of operations during activation of a wireless power transmission system (comparative example) that performs feedback control.

FIG. 2 is a diagram illustrating an example of operations when active a wireless power transmission system (comparative example) that performs such feedback control. FIG. 2 illustrates an example of the change over time of voltage (load voltage) provided to the load from starting of power transmission until the load is activated, with regard to two power receiving devices A and B that have different specifications.

Upon the power being turned on, the power transmitting device performs operations such as positioning the power transmitting coil and power receiving coil, and thereafter raises the transmission voltage in states from an initial voltage. When the transmitted voltage exceeds a certain value, a control circuit (e.g., a microcontroller) in the power receiving device is activated. The power receiving device then transmits an activation confirmation signal to the power transmitting device, to the effect that the control circuit has been activated. Upon receiving the activation confirmation signal, the power transmitting device holds the transmission voltage at a constant level. This power transmission from the initial voltage until a constant voltage is reached is called "preliminary power transmission".

Thereafter, the power receiving device transmits various types of signals to the power transmitting device. These signals include device information signals such as the maximum power set for the power receiving device (power class), and information identifying the device such as manufacturer ID or manufacturer mode or the like. These signals are received, and subsequently the power transmitting device starts main power transmission.

In the main power transmission, the power transmitting device receives signals indicating control error values from the power receiving device. A "control error value" is a difference value between the a requested voltage value that the load of the power receiving device requests and the current voltage value at the load. Upon having received a control error signal, the power transmitting device determines whether or not the value of the load voltage has reached the requested voltage value. In a case where the value of the load voltage has not reached the requested voltage value (i.e., the control error value is larger than 0), the power transmitting device increases the transmitted voltage so that the load voltage will be closer to the requested voltage value. Exchange of control error signals is repeatedly executed for a predetermined time period, for example.

Upon the transmission voltage reaching the requested voltage value, the load in the power receiving device is activated, and the load starts operating. Thereafter, the power transmitting device controls an inverter control within the power transmitting device so that the load voltage is at a constant value at each point in time. Control of the inverter circuits performed by changing control parameters such as the frequency, duty ratio, phase shift amount, and so forth, of control signals (e.g., pulse signals) supplied to multiple switching devices within the inverter circuit, which will be described later in detail. Phase shift amount means the difference phase between two pulse signals input to two switching devices that are turned on at the same time in a full-bridge inverter. Thus, the power transmitting device performs feedback control where feedback is repeated and the load voltage is brought closer to the requested voltage value, until there is no more error.

Note that the time over which preliminary transmission is performed is around several thousandths of a second (ms) to several hundredths of a second. The period over which the transmission voltage is maintained at a constant level can be from several hundredths of a second to several tenths of a second. The amount of time from having received the initial control error signal until the state transitions to a steady state can be from several tenths of a second to several seconds. The control error signals are periodically transmitted at time intervals that are several ms to several tens of ms long, for example. These times are only exemplary, and can change depending on the communication speed, for example.

The power receiving device A and power receiving device B that have different power specifications differ in the amount of time from transmitting the initial control error signal until the load is activated (called "load activation period"), as illustrated in FIG. 2. Accordingly, each time the power receiving device is exchanged, feedback control needs to be performed to satisfy the requested voltage of the power receiving device after exchange. Particularly, the load activation period is long in a case where a power receiving device that has a high requested voltage is attached.

Figure 3:
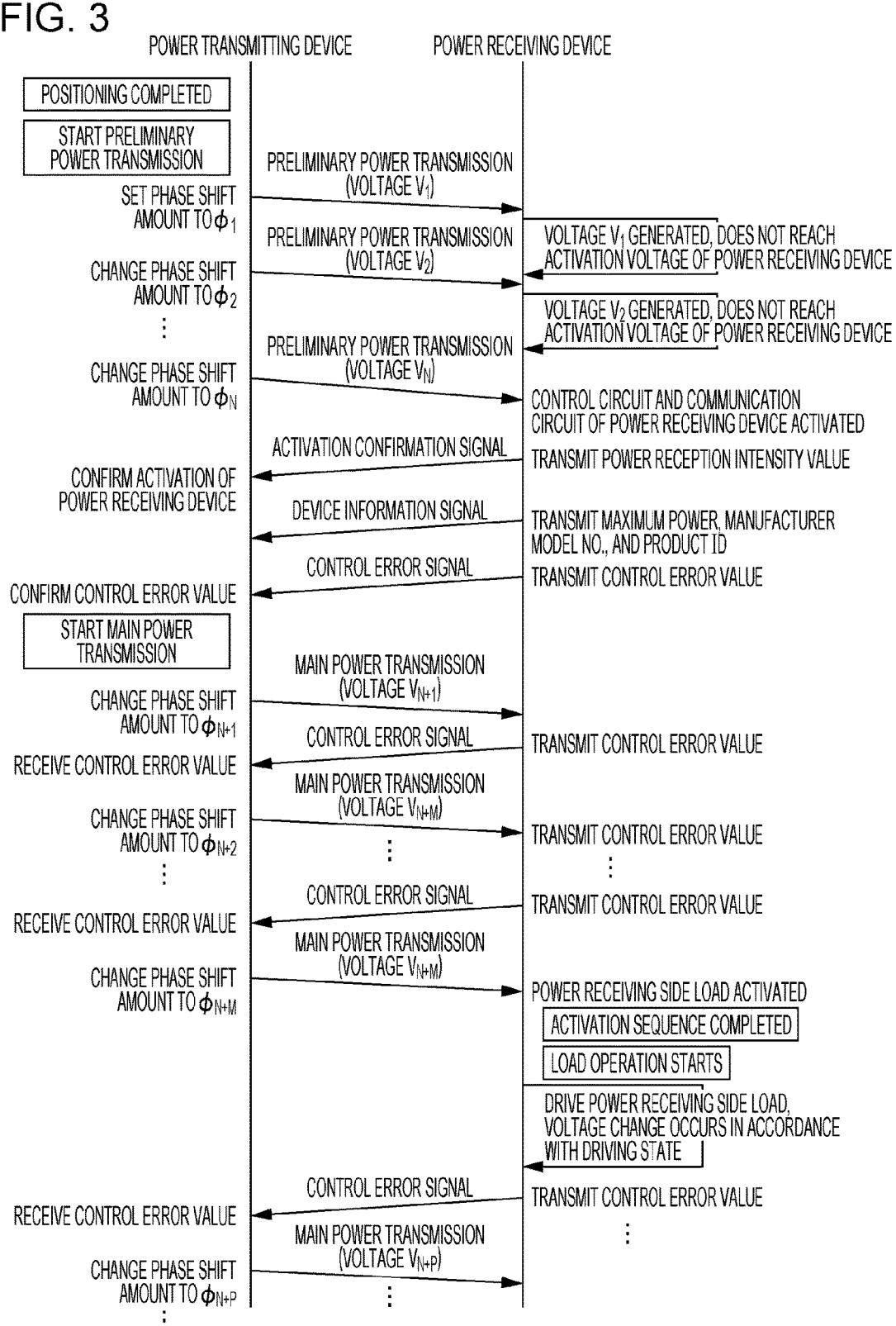
FIG. 3 is a sequence diagram illustrating operations in the comparative example in more detail.

FIG. 3 is a sequence diagram illustrating operations in the above-described comparative example in further detail. FIG. 3 illustrates an example of a case where phase shift amount is used as the control parameter.

The power transmitting device first performs positioning of the power transmitting device and the power receiving device. This "positioning" means to detect that the power transmitting antenna (including the power transmitting coil) in the power transmitting device, and the power receiving antenna (including the power receiving coil) in the power receiving device are in a positional relationship suitable for power transmission. Positioning is performed by, for example, the power receiving antennal receiving AC power from the power transmitting antenna, and detecting that the current flowing through the power transmitting antenna has exceeded a predetermined value. Change in voltage or electric power may be detected instead of current.

Once positioning is completed, preliminary power transmission is started. During the preliminary power transmission, the control circuit of the power transmitting device reduces the phase shift amount from an initial value $\phi_1$ in stages of predetermined amounts each. This operation is performed every certain time interval, for example, until the control circuit and communication circuit of the power receiving device are activated. The example illustrated in FIG. 3 demonstrates the control circuit and communication circuit of the power receiving device being activated at the point that the phase shift amount reaches $\phi_N$. Thereupon, the power transmitting device confirms activation of the power receiving device. Thereafter, the power receiving device transmits device information signals and control error signals to the power transmitting device. As mentioned earlier, a control error signal indicates the control error value which is the difference value been the requested voltage of the power receiving device (i.e., the activation voltage of the load), and the current voltage. The power receiving device receives these signals and starts main power transmission.

The power transmitting device performs feedback control based on the control error value, as described earlier. In the example illustrated in FIG. 3, the control circuit of the power transmitting device changes the phase shift amount to $\phi_{N+1}$ ($<\phi_N$) to increase the transmitted voltage. The power receiving detects a load voltage $V_{N+1}$ corresponding to the phase shift amount $\phi_{N+1}$, calculates the control error value, and transmits the control error signal to the power transmitting device. The power transmitting device receives this and reduces the phase shift amount to $\phi_{N+2}$. Thereafter, the power transmitting device reduces the phase shift amount in predetermined increments each until the control error value fed back from the power receiving device reaches zero. In the example in FIG. 3, the load at the power receiving side is activated at load voltage $V_{N+M}$ when the phase shift amount reaches $\phi_{N+M}$. This completes the activation sequence, and the load starts operating.

Now, fluctuation in voltage can occur while operating a load, in accordance with the driving state. Accordingly, even after the load has started operating, the power receiving device periodically transmits control error signals to the power transmitting device. The power transmitting device receives the control error signals and changes the phase shift amount accordingly. Thus, the load voltage is maintained at a constant level.

As described above, there has been a problem with the activation sequence of the comparative example illustrated in FIG. 3, in that a long amount of time is required from starting of the main power transmission until the load starts operating, i.e., feedback control takes a long time. This means that, in an arrangement where multiple power receiving devices having different power specifications are exchanged and used with one power transmitting device, standby time occurs due to feedback control each time the power receiving device is exchanged.

The present inventors have found the above-described problem in the comparative example, and studied a configuration to solve this problem. As a result, the present inventors have arrived at a conception that the activation time can be reduced by the power transmitting device acquiring control information relating to the power specifications of the power receiving device after having confirmed activation of the power receiving device, and setting suitable power transmitting parameters according to the power specifications thereof to drive the inverter circuit by. Now, "power specifications" means specifications relating to power transmission, such as requested voltage (V), load impedance (Z), and coupling coefficient (k) between the power transmitting antenna (power transmitting coil) and power receiving antenna (power receiving coil), and so forth, of the power receiving device. The information relating to the power specifications of the power receiving device is called "power receiving device control information". The "power receiving device requested voltage" means voltage necessary to activate a load connected to the rectifying circuit in the power receiving device. The structure and position of the power receiving antenna, and the functions and capabilities of the load differ from one power receiving device to another, so the power specifications differ from one power receiving device to another. Accordingly, acquiring that information beforehand enables power transmission to be performed at a suitable voltage in accordance with the power specifications of each power receiving device.

Through the above study, the present inventors have arrived at the following aspects disclosed below.

OVERVIEW OF EMBODIMENTS OF PRESENT DISCLOSURE

A wireless power transmission system according to an aspect of the present invention includes:
an inverter circuit that converts a first DC power supplied from a power source into AC power and outputs the AC power,
    a power transmitting antenna that wirelessly transmits the output AC power, and
    a power transmission control circuit that adjusts the voltage and frequency of the AC power output from the inverter circuit;
    a power receiving device including
    a power receiving antenna that receives the AC power transmitted from the power transmitting antenna, and
    a rectifying circuit that converts the received AC power into a second DC power; and
    a load into which the second DC power is input,
wherein the power transmitting device and the power receiving device are capable of being coupled and detached,
wherein the power receiving device further includes a receiving-side transmitter that transmits, to the power transmitting device, control information of the power receiving device including (i) a coupling coefficient between the power transmitting antenna and the power receiving antenna, (ii) requested voltage of the power receiving device, and (iii) load impedance of the load,
    wherein the power transmitting device further includes
    a transmitting-side receiver that receives the control information of the power receiving device from the receiving-side transmitter, and
    a table containing control parameters correlated with (i) the coupling coefficient, (ii) the requested voltage, and (iii) the load impedance,
    and wherein the power transmission control circuit
    causes the inverter circuit to output preliminary AC power to activate the power receiving device in a state where the power transmitting device and power receiving device are coupled,
    causes the transmitting-side receiver to receive the control information of the power receiving device from the power receiving device,
    determines the control parameter based on the control information by referring to the table, and
    adjusts the voltage of the AC power output from the inverter circuit using the control parameter.

According to the above aspect,
the power receiving device further includes a receiving-side transmitter that transmits, to the power transmitting device, control information of the power receiving device including (i) a coupling coefficient between the power transmitting antenna and the power receiving antenna, (ii) requested voltage of the power receiving device, and (iii) load impedance of the load,
the power transmitting device further includes
a transmitting-side receiver that receives the control information of the power receiving device from the receiving-side transmitter, and
a table containing control parameters correlated with (i) the coupling coefficient, (ii) the requested voltage, and (iii) the load impedance,
and the power transmission control circuit
causes the inverter circuit to output preliminary AC power to activate the power receiving device in a state where the power transmitting device and power receiving device are coupled,
causes the transmitting-side receiver to receive the control information of the power receiving device from the power receiving device,
determines the control parameter based on the control information by referring to the table, and
adjusts the voltage of the AC power output from the inverter circuit using the control parameter.

Accordingly, time required to activate the load, which is necessary in a case of performing feedback control, can be reduced. Thus, the activation time after having exchanged a power receiving device can be reduced, and work efficiency can be improved.

The power transmitting device and the power receiving device can be coupled and separated. For example, the power transmitting device may have a protrusion or a recess on a surface of the power transmitting device (e.g., on the surface of its casing), and the power receiving device may have a protrusion or a recess on a surface of the power receiving device (e.g., on the surface of its casing). In a case where the power transmitting device has a protrusion, the power receiving device has a recess. In a case where the power transmitting device has a recess, the power receiving device has a protrusion. The power transmitting device and the power receiving device can be coupled and separated, by the protrusion of the power transmitting device and the recess of the power receiving device being engaged, or by the recess of the power transmitting device and the protrusion of the power receiving device being engaged. Here, the term "coupled" means that the relative position of both is fixed to a degree where the coupling coefficient of the power transmitting antenna and the power receiving antenna does not change.

The term "control parameter" associated with the coupling coefficient, requested voltage, and load impedance, means a parameter that affects the amplitude of AC power transmitted from the power transmitting antenna. A control parameter may be frequency, or phase shift amount or duty ratio of pulse signals driving the inverter circuit, or the like. A "table containing control parameters" means a table structure containing values of control parameters as data. In the present specification, having a recording medium such as memory or the like that stores the data of such a table is expressed as "having a table". To "activate the power receiving device" means to activate a circuit in the power receiving device such as a receiving-side transmitter or the like (e.g., including a microcontroller).

A wireless power transmission system according to another aspect of the present invention includes:
a power transmitting device including
an inverter circuit that converts a first DC power supplied from a power source into AC power and outputs the AC power,
a power transmitting antenna that wirelessly transmits the output AC power, and a power transmission control circuit that adjusts the voltage and frequency of the AC power output from the inverter circuit;

a power receiving device including a power receiving antenna that receives the AC power transmitted from the power transmitting antenna, and a rectifying circuit that converts the received AC power into a second DC power;

a load into which the second DC power is input; and a control device including the power source, wherein the power transmitting device and the power receiving device are capable of being coupled and detached, wherein the control device transmits, to the power transmitting device, control information of the power receiving device including (i) a coupling coefficient between the power transmitting antenna and the power receiving antenna, (ii) requested voltage of the power receiving device, and (iii) load impedance of the load, wherein the power transmitting device further has a transmitting-side receiver that receives the control information of the power receiving device from the control device, and a table containing control parameters correlated with (i) the coupling coefficient, (ii) the requested voltage, and (iii) the load impedance, and wherein the power transmission control circuit determines the control parameter based on the control information by referring to the table, adjusts the voltage of the AC power output from the inverter circuit using the control parameter, and in a state where the power transmitting device and the power receiving device are coupled, outputs AC power for activating the power receiving device and the load to the inverter circuit, and activates the power receiving device and the load.

According to this aspect, the control device provided externally from the power transmitting device and power receiving device transmits, to the power transmitting device, control information of the power receiving device including (i) a coupling coefficient between the power transmitting antenna and the power receiving antenna, (ii) requested voltage of the power receiving device, and (iii) load impedance of the load.

Accordingly, the power transmitting device can acquire control information of the power receiving device, regardless of whether or not the power receiving device is activated. Thus, the time required for activation of the load can be reduced even further.

Embodiments of the present disclosure will be described below in further detail. It should be noted, however, that unnecessarily detailed description may be omitted. For example, detailed description of well-known items and redundant description of configurations which are essentially the same, may be omitted. This is to avoid unnecessary redundancy in the following description and to facilitate understanding of those skilled in the art. The present inventors have provided the attached drawings and the following description to facility sufficient understanding of the present disclosure by those skilled in the art, and it should be understood that the providing of these is not intended to restrict the subject matter laid forth in the Claims. In the following description, components which are the same or are similar are denoted by the same reference numerals.

In the present specification, expression such as "transmitting-side so-and-so" and "receiving-side so-and-so" may be used to facilitate understanding. Further, the "transmitting side" and "receiving side" of these expressions may be omitted in some cases for the sake of brevity.

First Embodiment

Figure 4:
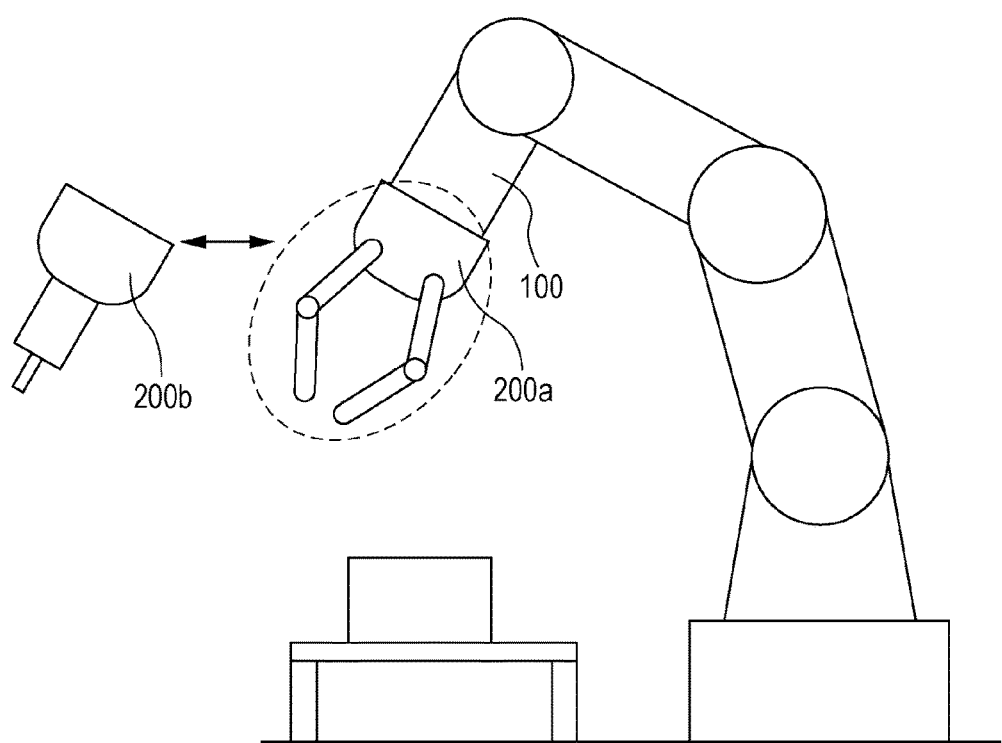
FIG. 4 is a diagram schematically illustrating a wireless power transmission system according to a first embodiment.

FIG. 4 is a diagram schematically illustrating the wireless power transmission system according to a first embodiment. This wireless power transmission system has the same external appearance as the system according to the comparative example in FIG. 1, but the control method when activating is different. This wireless power transmission system can improve work efficiency by reducing the activation time at the time of exchanging power receiving devices 200a and 200b. The wireless power transmission system also has multiple moving parts other than the power receiving devices 200a and 200b, with each moving part being provided with a motor. In a case where the power receiving devices 200a and 200b are not distinguished in particular in the following description, these will be collectively referred to as power receiving device 200.

Figure 5A:
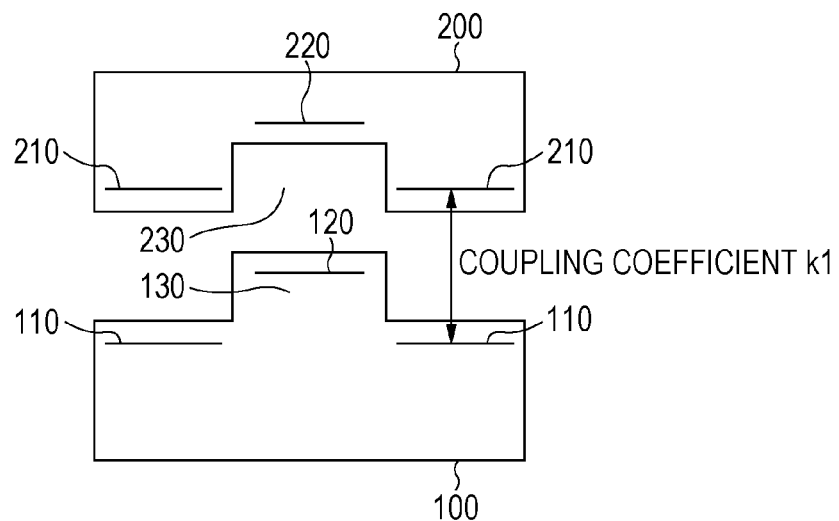
FIG. 5A is a diagram illustrating an example of coupling a power transmitting device and a power receiving device.

FIG. 5A is a diagram illustrating an example of coupling a power transmitting device 100 and power receiving device 200. The power transmitting device 100 in this example includes a power transmitting antenna 110 and a transmitting-side coil 120. The power receiving device 200 includes a power receiving antenna 210 and a receiving-side communication coil 220. The power transmitting device 100 has a protrusion 130 and the power receiving device 200 has a recess 230. Engaging and disengaging the protrusion 130 and recess 230 allows the power transmitting device 100 and power receiving device 200 to be coupled and separated. In a state where the power transmitting device 100 and power receiving device 200 are coupled, the power transmitting antenna 110 and power receiving antenna 210 face each other. In this state, power is transmitted from the power transmitting antenna 110 to the power receiving antenna 210. The coupling coefficient in this state is k1.

An arrangement may be made opposite to the example in FIG. 5A, so that the power transmitting device 100 has a recess and the power receiving device 200 has a protrusion. In this case, engaging and disengaging the protrusion of the power receiving device 200 and the recess allows of the power transmitting device 100 the power transmitting device 100 and power receiving device 200 to be coupled and separated. The configuration is not restricted to engaging of a recess and protrusion, and the power transmitting device 100 and power receiving device 200 may be configured to be coupled and separated by screwing, latching, or other methods.

Figure 5B:
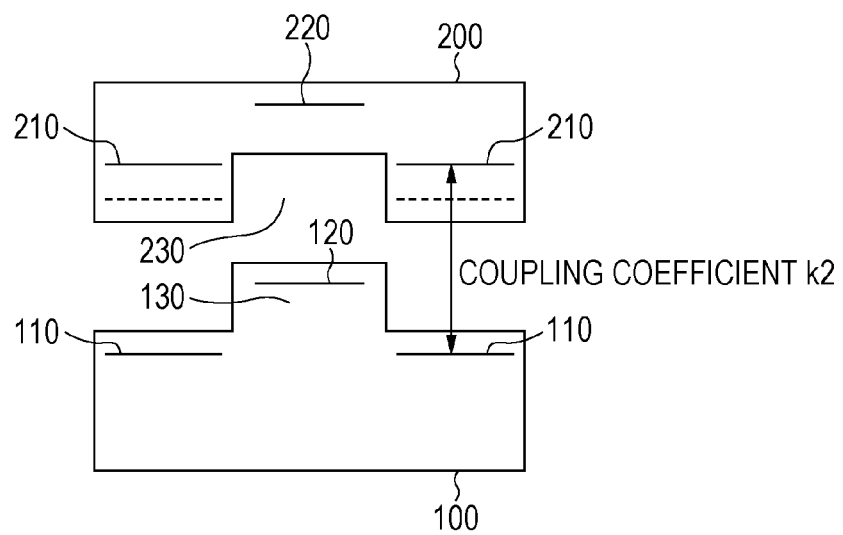
FIG. 5B is a diagram illustrating an example of the power receiving device where the position of a power receiving antenna is different form the example in FIG. 5A.

FIG. 5B is a diagram illustrating an example of a power receiving device 200, where the position of the power receiving antenna 210 differs from that in the example in FIG. 5A. In this example, the distance between the power transmitting antenna 110 and the power receiving antenna 210 is longer than the distance in the example in FIG. 5A. Accordingly, the coupling coefficient k2 here at the time of coupling is smaller than the coupling coefficient k1 in the example in FIG. 5A. Accordingly, the coupling coefficient may differ depending on the power receiving device 200. Also, the requested voltage of the power receiving device 200 and the impedance of the load connected to the power receiving device 200 may differ depending on the power receiving device 200. Accordingly, in a case where the power receiving device 200 is exchanged, control needs to be performed to change amplitude of the voltage of the AC power that the power transmitting device 100 transmits, and so forth.

Figure 6:
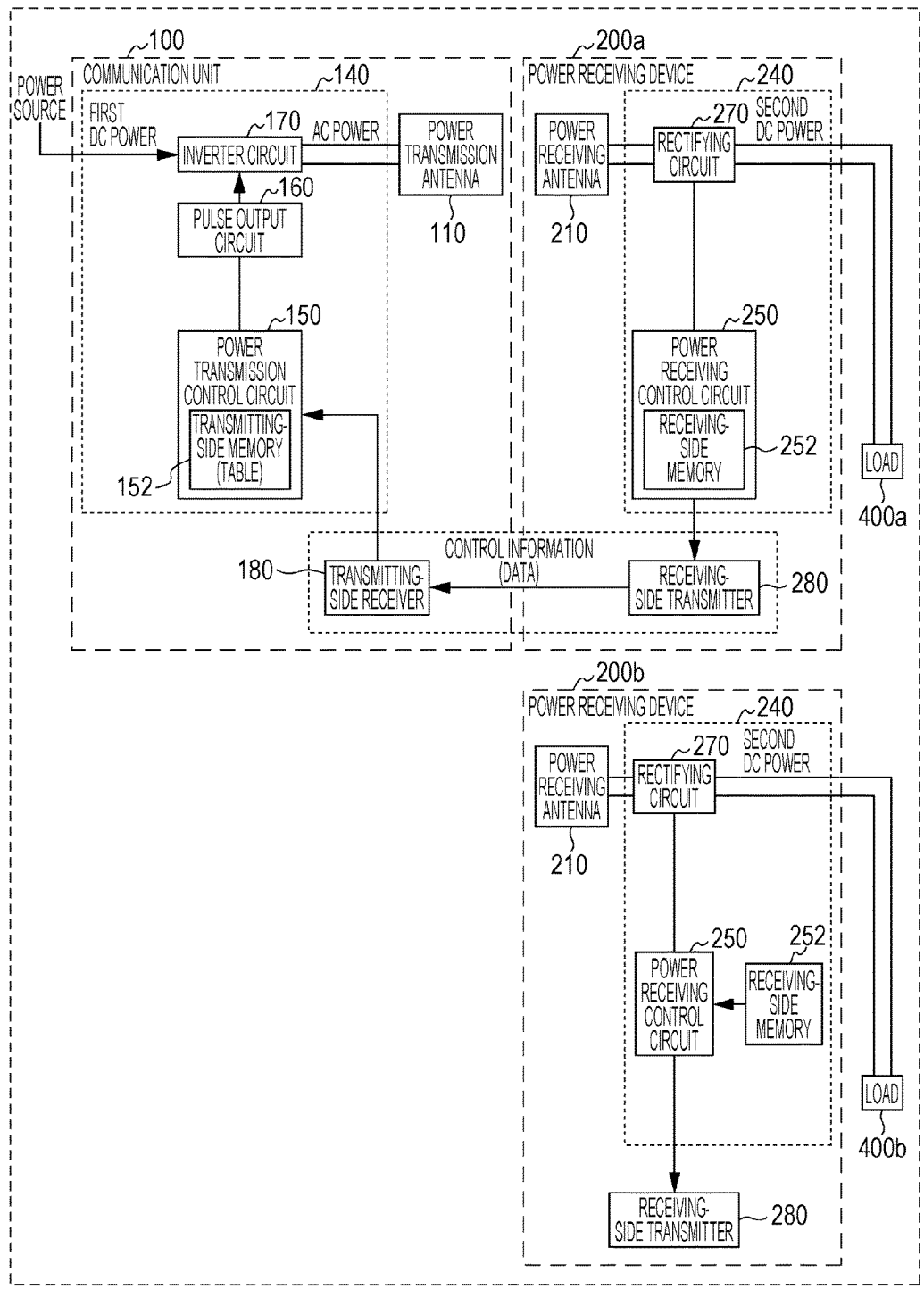
FIG. 6 is a block diagram illustrating the configuration of the wireless power transmission system according to the first embodiment.

FIG. 6 is a block diagram illustrating the configuration of the wireless power transmission system according to the first embodiment. FIG. 6 illustrates the power transmitting device 100 and both power receiving devices 200a and 200b. The wireless power transmission system according to the present embodiment includes the power transmitting device 100, the power receiving device 200 (power receiving devices 200a or 200b), and a load 400 (load 400a or load 400b). Although the load 400 is situated outside the power receiving device 200 in the example illustrated in FIG. 6, the load 400 may be built into the power receiving device 200.

The power transmitting device 100 includes a power transmitting circuit 140, the power transmitting antenna 110, and a transmitting-side receiver 180. The power transmitting circuit 140 includes an inverter circuit 170, a pulse output circuit 160, and a power transmission control circuit 150. The inverter circuit 170 is connected to an external power source, and converts a first DC power supplied from the power source into AC power and outputs. The power transmitting antenna 110 is connected to the inverter circuit 170, and wirelessly transmits the AC power that has been output. The power transmission control circuit 150 drives the pulse output circuit 160 to adjust the AC power output from the inverter circuit 170. The power transmission control circuit 150 has transmitting-side memory 152 that stores later-described tables. The transmitting-side memory 152 may be provided outside of the power transmission control circuit 150. The pulse output circuit 160 is a gate driver for example, and supplies pulse signals to multiple switching devices included in the inverter circuit 170, in accordance with instructions from the power transmission control circuit 150. In response to these pulse signals, the inverter circuit 170 switches the conducting (on)/non-conducting (off) states of the switching devices. The transmitting-side receiver 180 is a communication circuit (communication device) that receives control information (data) transmitted from the power receiving device 200.

The power receiving device 200a includes the power receiving antenna 210, a power receiving circuit 240, and a receiving-side transmitter 280. The power receiving circuit 240 includes a rectifying circuit 270 and a power receiving control circuit 250. The power receiving antenna 210 receives AC power transmitted from the power transmitting antenna, which is then output. The rectifying circuit 270 is connected to the power receiving antenna 210, the load 400a, and the power receiving control circuit 250. The rectifying circuit 270 converts the AC power received by the power receiving antenna 210 into a second DC voltage, and outputs to the load 400a. The power receiving control circuit 250 includes receiving-side memory 252 that stores control information such as the requested voltage, coupling coefficient, load impedance, etc., of the power receiving device 200a. At the time of activation, the power receiving control circuit 250 instructs a receiving-side transmitter 280 to transmit this control information to the power transmitting device 100. The load 400a is connected to the power receiving device 200a and the rectifying circuit 270. The second DC power converted by the rectifying circuit 270 is input to the load 400a.

The power receiving device 200b has the same components as the power receiving device 200a. In the example illustrated in FIG. 6, the receiving-side memory 252 in the power receiving device 200b is positioned outside the power receiving control circuit 250. The receiving-side memory 252 thus does not have to be included inside the power receiving control circuit 250. The power receiving device 200b is connected to load 400b. The load 400b may have different functions and capabilities from the load 400a. In other words, the load 400b may have a different impedance from the load 400a, and be driven by a different voltage.

Although the power receiving devices 200a and 200b are hands attached to the tip of a robot arm in the present embodiment, they may be other devices. For example, they may be rotating portions of surveillance cameras. The loads 400a and 400b in the present embodiment are devices including motors, such as actuators installed in hands at the tip of a robot arm. The load may be an imaging device such as a CCD camera and lighting device and so forth installed in the rotating portion of a surveillance camera.

Figure 7:
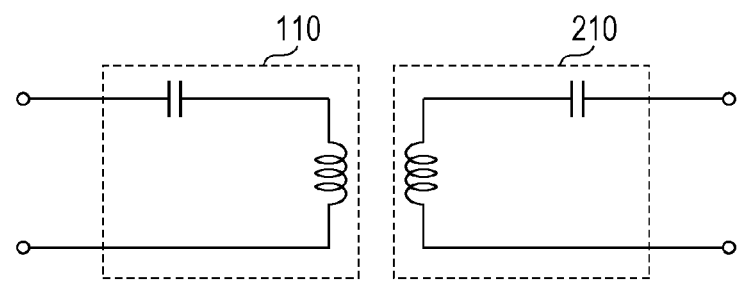
FIG. 7 is a diagram illustrating an example of an equivalent circuit of power transmitting antennas having a serial resonance circuit configuration.

Each of the power transmitting antenna 110 and power receiving antenna 210 can be realized by a resonance circuit including a coil and capacitor, for example. FIG. 7 illustrates an example of an equivalent circuit of the power transmitting antenna 110 and power receiving antenna 210, having a serial resonance circuit configuration. The example illustrated is not restrictive, and the antennas may have a parallel resonance circuit configuration. In the present specification, the coil in the power transmitting antenna 110 is referred to as a transmitting coil, and the coil in the power receiving antenna 210 is referred to as a receiving coil. The inductive coupling (i.e., magnetic coupling) between the transmitting coil and receiving coil of the power transmitting antenna 110 and power receiving antenna 210 enables electric power to be wirelessly transmitted. The antennas may have a configuration to wirelessly transmit electric power using electric coupling instead of magnetic coupling. In this case, the antennas may have two electrodes for transmitting and receiving, and a resonance circuit including an inductor and a capacitor. A power transmitting antenna and power receiving antenna that use electric coupling are suitably used in a case of wirelessly transmitting electric power to device that move, such as transportation robots within a factory, for example.

The power transmission control circuit 150 and power receiving control circuit 250 may be integrated circuits including a processor and memory, such as a microcontroller or the like, for example. A control program (software) for realizing the later-described operations may be sorted in the memory. The later-described functions are realized by the processor executing the control program. The power transmission control circuit 150 and power receiving control circuit 250 may be realized by hardware alone, without using software. The power transmission control circuit 150 and transmitting-side receiver 180 may be a single integrated circuit component. In the same way, the power receiving control circuit 250 and receiving-side transmitter 280 may be a single integrated circuit component.

The wireless information communication system used by the transmitting-side receiver 180 and receiving-side transmitter 280 is not restricted; any format may be used. For example, amplitude modulation, frequency modulation, wireless LAN, ZigBee (a registered trademark), or like wireless system may be used.

At the time of activation, the receiving-side transmitter 280 in the present embodiment transmits to the power transmitting device 100 the control information including (i) the coupling coefficient between the power transmitting antenna 110 and power receiving antenna 210, (ii) requested voltage, and (iii) load impedance. The control information is saved in the receiving-side memory 252 beforehand. This control information differs depending on the circuit configuration of the power receiving device 200 and the characteristics of the connected load. Accordingly, the control information of the power receiving device 200 may also be referred to as "circuit specifications".

The transmitting-side memory 152 has tables including control parameters correlated with the (i) coupling coefficient, (ii) requested voltage, and (iii) load impedance. The tables stipulate combinations of coupling coefficient (k), requested voltage (V), and load impedance (Z), and correlation with control parameters.

Control parameters are parameters that determine the voltage level output from the inverter circuit 170. Control parameters may be, for example, the frequency (f) of pulse signals supplied to the multiple switching devices that the inverter circuit 170 has, phase different (also called "phase shift amount") of two pulse signals supplied to two switching devices to be turned on at the same time, or duty ratio of pulse-width modulation (PWM) pulse signals supplied to each of the multiple switching devices. Although not illustrated in FIG. 6, an arrangement may be made where a DC-DC converter is disposed upstream of the inverter circuit 170, with the power transmission control circuit 150 changing the magnitude of the voltage of the first DC power input to the inverter circuit 170. In such an arrangement, the value of the output voltage of the DC-DC converter may be taken as a control parameter. The power transmission control circuit 150 can adjust the magnitude of the voltage output from the DC-DC converter by changing the switching frequency of the switching devices within the DC-DC converter. The level of AC power output from the inverter circuit 170 can be changed by changing the control parameters described above, and thus the amplitude of the AC power than the power receiving device 200 receives can be changed.

Figure 8A:
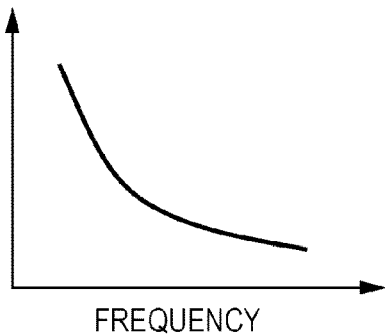
FIG. 8A is a diagram schematically illustrating dependency on frequency of the voltage amplitude at both ends of a coil of the power transmitting antenna.
Figure 8B:
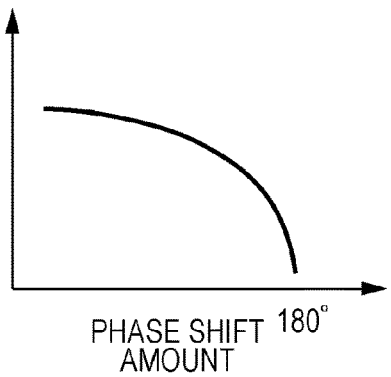
FIG. 8B is a diagram schematically illustrating dependency on phase shift amount of the voltage amplitude at both ends of a coil of the power transmitting antenna.
Figure 8C:
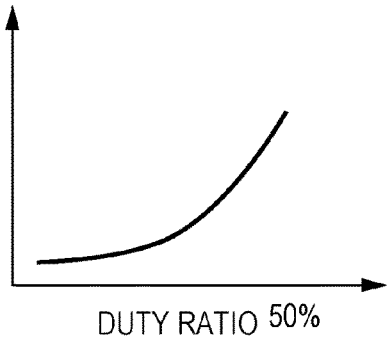
FIG. 8C is a diagram schematically illustrating dependency on duty ratio of the voltage amplitude at both ends of a coil of the power transmitting antenna.
Figure 8D:
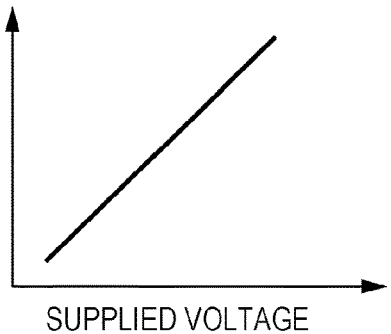
FIG. 8D is a diagram schematically illustrating dependency on voltage supplied to an inverter circuit of the voltage amplitude at both ends of a coil of the power transmitting antenna.

FIGS. 8A through 8D schematically illustrate examples of the dependency of the voltage amplitude at both ends of the coil of the power transmitting antenna 110 on frequency, phase shift amount, duty ratio, and voltage supplied to the inverter circuit 170, respectively. Increasing the frequency tends to reduce the amplitude of voltage at both ends of the coil, as illustrated in FIG. 8A. However, at the low-frequency band, reducing the frequency tends to lower the amplitude of voltage, which is an opposite tendency. Increasing the phase shift amount in the range from 0° to 180° reduces the time average of voltage amplitude at both ends of the coil, as illustrated in FIG. 8B. Increasing the duty ratio within a range from 0% to 50% increases the time average of voltage amplitude at both ends of the coil, as illustrated in FIG. 8C. Increasing the voltage supplied to the inverter circuit 170 increases the voltage amplitude at both ends of the coil, as illustrated in FIG. 8D. Accordingly, the power transmission control circuit 150 can control the voltage amplitude at both ends of the coil of the power transmitting antenna 110, using at least one of frequency, phase shift amount, duty ratio, and supplied voltage, as a communication parameter.

Figure 9:
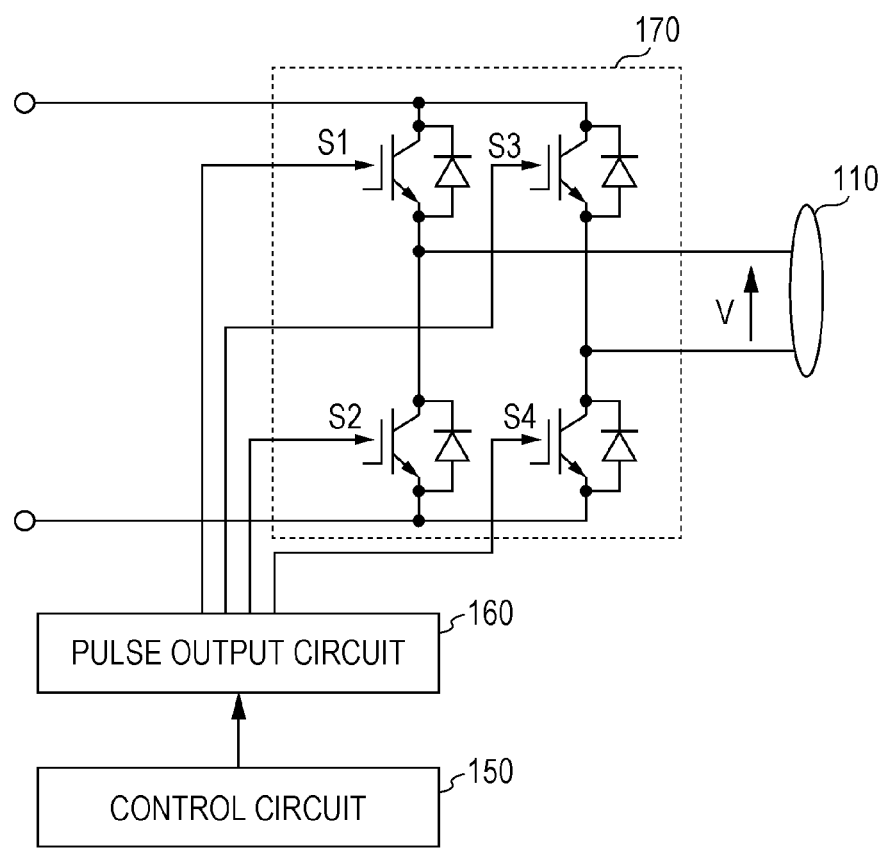
FIG. 9 is a diagram illustrating a configuration example of the inverter circuit.

FIG. 9 is a diagram illustrating a configuration example of the inverter circuit 170. The inverter circuit 170 has multiple switching devices S1 through S4 that change between a conducting state and a non-conducting state in accordance with pulse signals supplied from the pulse output circuit 160. Switching the conducting/non-conducting states of the switching devices allows the input DC power to be converted into AC power. The example in FIG. 9 illustrates a full-bridge inverter circuit including the four switching devices S1 through S4. The switching devices in this example are insulated gate bipolar transistors (IGBT), but other types of switching devices may be used, such as metal-oxide semiconductor field-effect transistors (MOSFET) or the like.

Out of the four switching devices S1 through S4 in the example illustrated in FIG. 9, the switching devices S1 and S4 (first switching device pair) output voltage of the same polarity as the supplied DC voltage when conducting. On the other hand, the switching devices S2 and S3 (second switching device pair) output voltage of the opposite polarity to the supplied DC voltage when conducting. The pulse output circuit 160 supplies pulse signals to the gates of the four switching devices S1 through S4 in accordance with instructions from the power transmission control circuit 150. At this time, amplitude control can be performed by adjusting the phase difference of two pulse signals being supplied to the first switching device pair (S1 and S4) and the second switching device pair (S2 and S3).

Figure 10A:
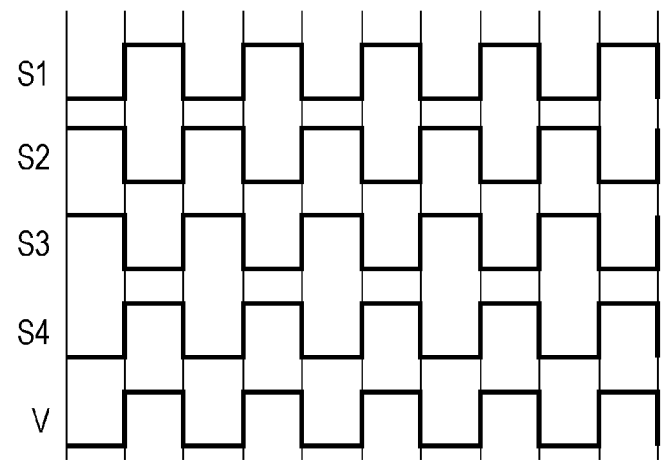
FIG. 10A is a first diagram for describing amplitude control based on phase difference of pulse signals.
Figure 10B:
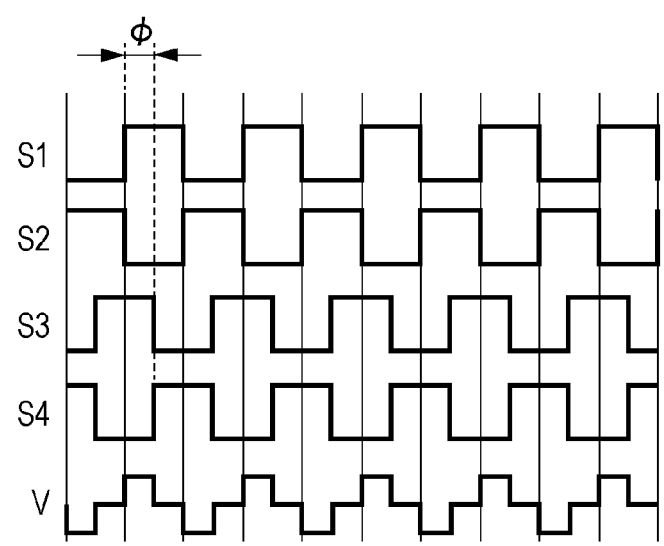
FIG. 10B is a second diagram for describing amplitude control based on phase difference of pulse signals.

FIGS. 10A and 10B are diagrams for describing amplitude control based on the phase difference of pulse signals. FIG. 10A schematically illustrates the temporal change of voltage V output from the inverter circuit 170 along with the four pulses signals in a case where the phase shift amount φ of the two pulse signals supplied to the switching devices S1 and S4, and the phase shift amount φ of the two pulse signals supplied to the switching devices S2 and S3, are both 0°. FIG. 10B schematically illustrates the temporal change of voltage V along with the pulses signals in a case where the phase shift amount φ is 90°. Temporally shifting the leading-edge and trailing-edge timing of the pulse signals to be input to the switching devices S3 and S4 as to the leading-edge and trailing-edge timing of the pulse signals to be input to the switching devices S1 and S2 adjusts the phase shift amount φ. Changing the phase shift amount φ changes the output time ratio of the voltage V (i.e., the proportion of one cycle where a non-zero value is assumed). The closer the phase shift amount φ is to 0°, the larger the output time ratio of the voltage V is, and the closer the phase shift amount φ is to 180°, the smaller the output time ratio of the voltage V is. The voltage V output from the inverter circuit 170 may be converted into sinusoidal voltage by a smoothing circuit not illustrated, and supplied to the power transmitting antenna 110. The amplitude of the sinusoidal voltage changes depending on the output time ratio. Accordingly, changing the phase shift amount φ can change the time average of the amplitude of the AC voltage input to the power transmitting antenna 110.

Figure 11:
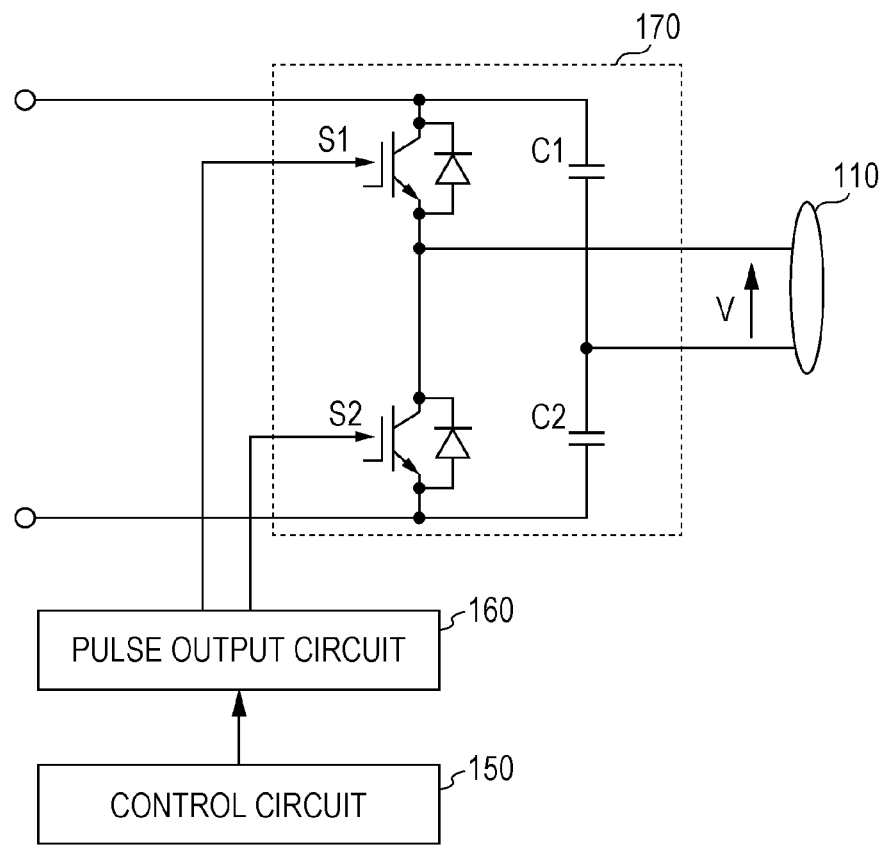
FIG. 11 is a diagram illustrating another configuration example of the inverter circuit.

FIG. 11 is a diagram illustrating another configuration example of the inverter circuit 170. The inverter circuit 170 in this example is a half-bridge inverter circuit. In a case where a half-bridge inverter circuit is being used, the above-described phase control cannot be applied. In this case, the time average of the voltage amplitude can be controlled by controlling the duty ratio of the pulse signals input to the switching devices.

The inverter circuit 170 is a half-bridge inverter circuit including two switching devices S1 and S2, and two capacitors. The two switching devices S1 and S2, and the two capacitors C1 and C2 are connected in parallel. One end of the power transmitting antenna 110 is connected to a point between the two switching devices S1 and S2, and the other end is connected to a point between the two capacitors C1 and C2.

The power transmission control circuit 150 and pulse output circuit 160 supply pulse signals to the switching devices so that the switching devices S1 and S2 go on alternatingly. Thus, the DC power is converted into AC power.

In this example, the output time ratio of the output voltage V can be adjusted by adjusting the duty ratio of the pulse signals (i.e., the proportion of time of being on in one cycle). Thus, the AC power being input to the power transmitting antenna 110 can be controlled.

Figure 12A:
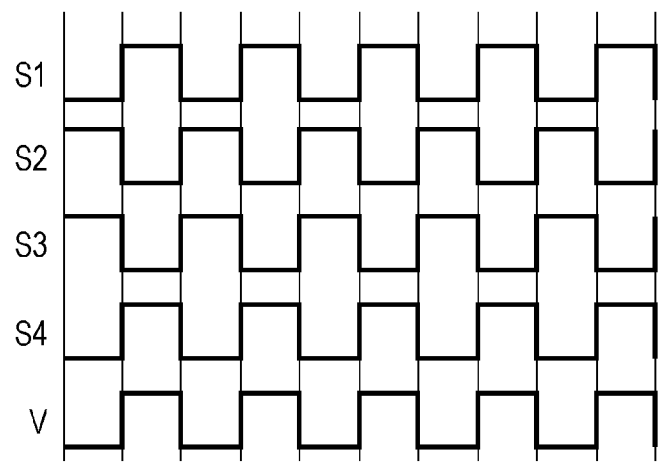
FIG. 12A is a first diagram for describing duty control.
Figure 12B:
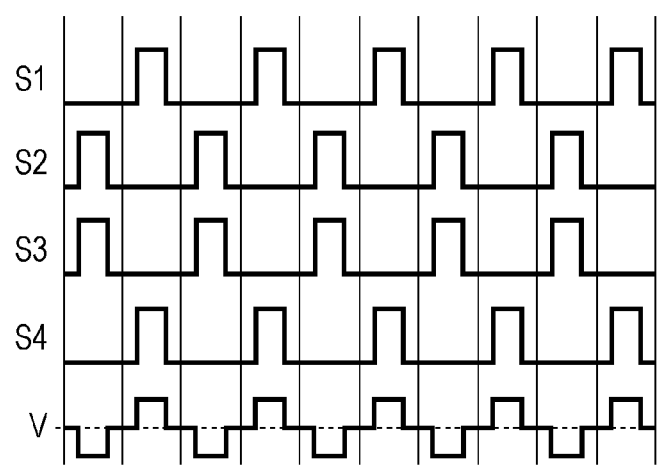
FIG. 12B is a second diagram for describing duty control.

FIGS. 12A and 12B are diagrams for describing duty control. FIG. 12A illustrates an example of waveforms of output voltage V, along with pulse signals input to the switching devices S1 through S4 in a case where the duty ratio of the pulse signals is 0.5 (50%). FIG. 12B illustrates an example of waveforms of output voltage V, along with pulse signals input to the switching devices S1 through S4 in a case where the duty ratio of the pulse signals is 0.25 (25%). As can be seen from the drawings, changing the duty ratio enables the output time ratio of the voltage V (i.e., the proportion of one cycle where a non-zero value is assumed) to be changed. Accordingly, the voltage amplitude of the AC power received by the power receiving antenna 210 can be changed. Pulse signals with such different duty ratios are generated by the pulse output circuit 160 including a PWM control circuit, for example. The duty ratio is adjusted within a range of 0% to 50%. When the duty ratio is 50%, the amplitude of the transmitting voltage is the largest, and when the duty ratio is 0%, the amplitude of the transmitting voltage is the smallest. This sort of duty control can also be performed in the same way using the full-bridge inverter circuit illustrated in FIG. 9.

Next, the operations of the present embodiment will be described. A case is assumed in the description below where the amplitude of the AC power is adjusted using the frequency of the transmitted AC power as a control parameter. The following description is also applicable to cases of using the aforementioned phase shift amount, duty ratio, and output voltage of the DC-DC converter as control parameters, instead of the frequency.

FIG. 13 illustrates an example of temporal change of voltage supplied to the load in the present embodiment. In a case where the power receiving control circuit 250 of the power receiving device 200 is activated by preliminary power transmission in the present embodiment, control information indicating the circuit specifications (coupling coefficient k, requested voltage V, and load impedance Z) of the power receiving device 200 is transmitted to the power transmitting device 100. Upon receiving the control information, the power transmitting device 100 references a table, changes the frequency to a frequency that satisfies the requested voltage of the power receiving device 200, and transmits power. As a result, the load 400 can be activated right away and operations can be started, without performing feedback control.

Figure 14:
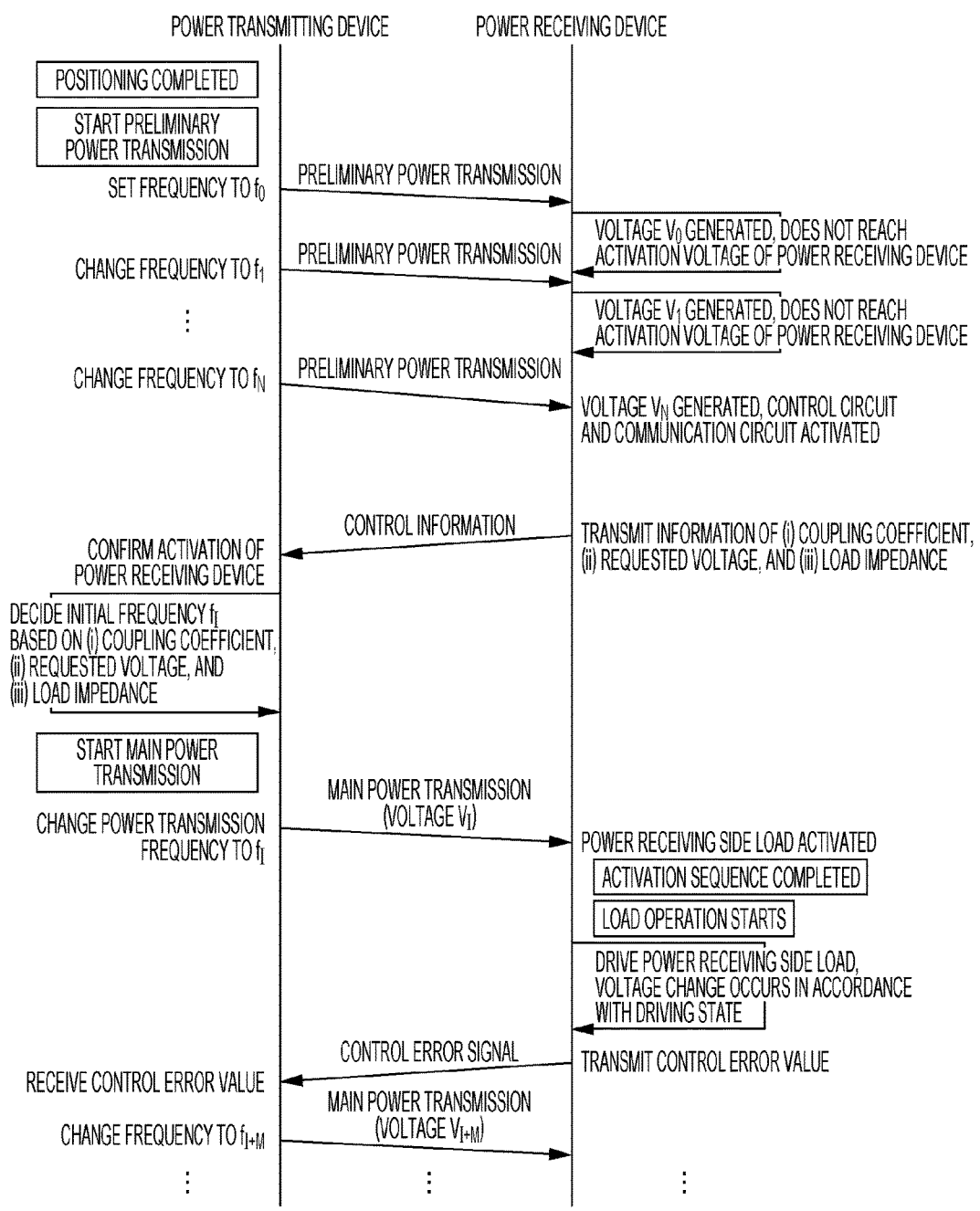
FIG. 14 is a sequence diagram illustrating the operations in the first embodiment in greater detail.

FIG. 14 is a sequence diagram illustrating operations in the present embodiment in further detail. As illustrated in FIG. 14, the power transmitting device 100 first performs positions of the power transmitting device 100 and power receiving device 200. This positioning is the same as the operation described in the comparative example with reference to FIG. 3.

Once positioning is complete, preliminary power transmission is started. In the preliminary power transmission, the power transmission control circuit 150 changes the frequency from an initial frequency $f_0$ in stages by predetermined increments. This operation is performed every certain time interval, for example, until the power receiving control circuit 250 and receiving-side transmitter 280 of the power receiving device 200 are activated. At the point that the frequency reaches $f_N$ in the example illustrated in FIG. 14, the power receiving control circuit 250 and receiving-side transmitter 280 of the power receiving device 200 are activated. The receiving-side transmitter 280 transmits control information including the (i) coupling coefficient, (ii) requested voltage, and (iii) load impedance, to the power transmitting device 100. Note that an activation confirmation signal and device information signals may be transmitted, in the same way as in the comparative example illustrated in FIG. 3. The power transmitting device 100 receives the control information and confirms activation of the power receiving device 200. The power transmission control circuit 150 references a table stored in the transmitting-side memory 152, and determines a frequency $f_I$ corresponding to the combination of the (i) coupling coefficient, (ii) requested voltage, and (iii) load impedance. The power transmission control circuit 150 then drives the inverter circuit 170 and starts main power transmission using that frequency $f_I$.

The load voltage $V_I$ corresponding to the frequency $f_I$ matches the activation voltage of the load 400 in the present embodiment. Accordingly, the load 400 is immediately activated, and starts operating. Now, the load voltage may change while operating due to the driving state of the load 400. Accordingly, after starting load operation, the power receiving control circuit 250 and receiving-side transmitter 280 transmit a control error signal indicating the control error difference, which is the difference value between the requested voltage and the current voltage, to the power transmitting device 100. The power transmission control circuit 150 changes the frequency based on the control error value, so that the error approaches zero. In this way, feedback control may be performed after the load has started operating.

Figure 15:
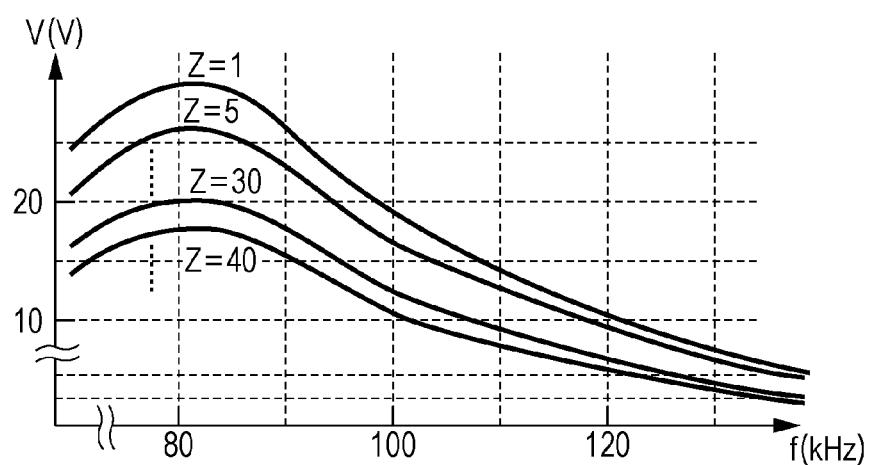
FIG. 15 is a diagram illustrating frequency-output voltage characteristics in each load impedance.

FIG. 15 is a diagram illustrating frequency-output voltage characteristics at each load impedance. The coupling coefficient here is a constant value. It can be seen here that the frequency-output voltage characteristics differ depending on the load impedance. The frequency-output voltage characteristics also differ depending on the coupling coefficient. Accordingly, information of the load impedance and coupling coefficient is necessary to determine a frequency that will satisfy the requested voltage of the power receiving device 200.

FIG. 16 is a diagram illustrating an example of tables stored in the transmitting-side memory 152. A table is prepared for each coupling coefficient value, and the tables contain data of frequency values corresponding to combinations of load impedance and requested voltage. The power transmission control circuit 150 selects the table to use, based on the coupling coefficient included in the control information transmitted from the power receiving device 200. Next, the value of the initial frequency to use for the main power transmission is determined from the table, based on the load impedance and requested voltage information included in the control information. FIG. 16 illustrates an example where a frequency of 95 kHz is selected in a case where the coupling coefficient is 0.7, the load impedance is 30Ω, and the requested voltage is 15 V. In a case where the control parameter is other than frequency (e.g., phase shift amount, duty ratio, DC-DC converter output voltage, etc.), similar tables may be used. In a case where the requested voltage is specified in the form of a range, the control parameter information may be in the form of a range, which will be described in a second embodiment. For example, information such as "95±5 kHz" or "90 to 100 kHz" may be stored in a table.

Figure 17:
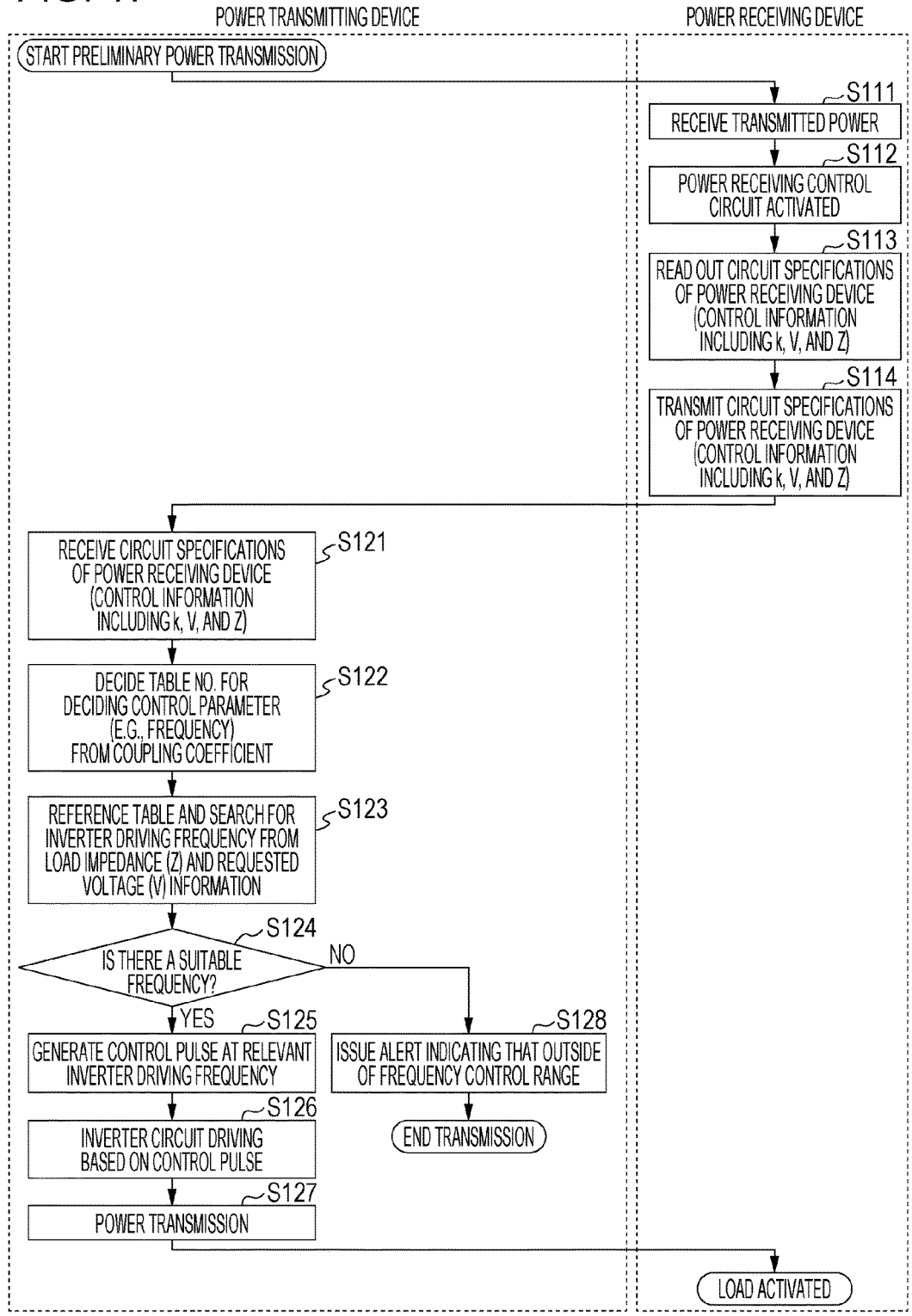
FIG. 17 is a flowchart illustrating operations of the power transmitting device and the power receiving device according to the first embodiment.

Next, the operations of the present embodiment will be described in further detail with reference to the flowchart in FIG. 17. FIG. 17 is a flowchart of the operations of the power transmitting device 100 and power receiving device 200 according to the present embodiment.

First, the power transmitting device 100 starts preliminary power transmission. The power receiving device 200 receives the transmitted electric power (step S111). Eventually, the power receiving control circuit 250 is activated (step S112). The power receiving control circuit 250 reads out the circuit specifications (control information including the coupling coefficient k, requested voltage V, and load impedance Z) from the receiving-side memory 252 (step S113). The receiving-side transmitter 280 transmits the control information to the power transmitting device 100 (step S114).

The power transmission control circuit 150 receives the control information via the transmitting-side receiver 180 (step S121). The table to use to determine the control parameters (frequency in the present embodiment) is determined from the coupling coefficient information included in the control information (step S122). Next, the table is referenced, and the frequency to drive the inverter circuit 170 with is searched from the load impedance and requested voltage information (step S123). The power transmission control circuit 150 determines whether or not there is a suitable frequency in the table (step S124). In a case where there is no suitable frequency, an alert is generated indicating that the situation is outside of frequency control (step S128). The alert may be output from an unshown display or speaker, as visual or audible information. In a case where there is a suitable frequency, the power transmission control circuit 150 causes the pulse output circuit 160 to generate control pulses of the relevant frequency (step S125). The inverter circuit 170 is driven in accordance with these control pulses (step S126). Accordingly, electric power of a voltage suitable for the activation voltage of the load is transmitted (step S127). As a result, the load is activated, and operation of the load is started.

As described above, the power transmission control circuit 150 according to the present embodiment performs the following operations.

(1) In a state where the power transmitting device 100 and power receiving device 200 are coupled, causes the inverter circuit 170 to output preliminary AC power to activate the power receiving device 200, and activates the power receiving device 200.
(2) Causes the transmitting-side receiver 180 to receive, from the activated power receiving device 200, control information of the power receiving device 200.
(3) Determines the control parameter based on the control information by referring to the table.
(4) Adjusts the voltage and frequency of the AC power output from the inverter circuit 170 using the control parameter.

The power transmission control circuit 150 performs adjustment of the voltage of the AC power so as to match the requested voltage of the power receiving device 200, by adjusting the voltage of the AC power using the control parameter in particular. Accordingly, the feedback control at the time of activation, which had been necessary in the comparative example, can be omitted, and activation time can be reduced.

Note that the power transmission control circuit 150 may perform control to stop driving of the inverter circuit 170 or the like, based on information (e.g., malfunction information) received from the power receiving device 200 or an external control device (controller). The power transmission control circuit 150 may also transmit signals to the external control device (indicating that power transmission has been stopped, for example), based on information received from the power receiving device 200 or the external control device. Thus, safety of wireless power transmission can be improved.

Second Embodiment

Figure 18:
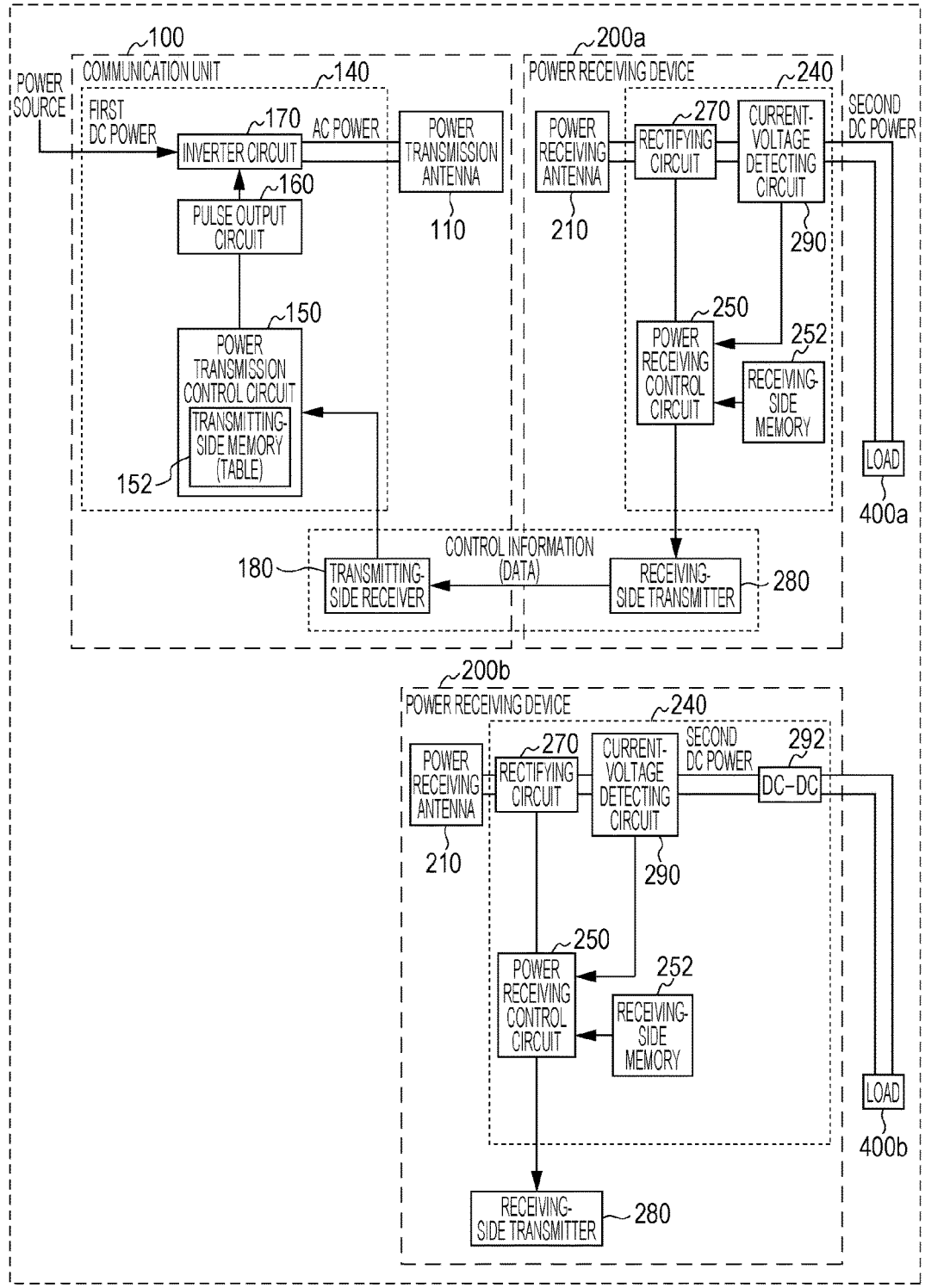
FIG. 18 is a block diagram illustrating the configuration of a wireless power transmission system according to a second embodiment.

FIG. 18 is a block diagram illustrating the configuration of the wireless power transmission system according to a second embodiment. The wireless power transmission system according to the present embodiment differs from the first embodiment, in that the activation control in the first embodiment and feedback control in the comparative example are used in conjunction. The power receiving device 200b can also handle a wide range of change in received voltage using a transformer (DC-DC converter) 292 or the like. The DC-DC converter 292 adjusts the voltage so as to match the requested voltage of the load, even in a case where the voltage of the second DC power output from the rectifying circuit 270 is deviated from the requested voltage (e.g., 5 V) of the load.

Figure 19:
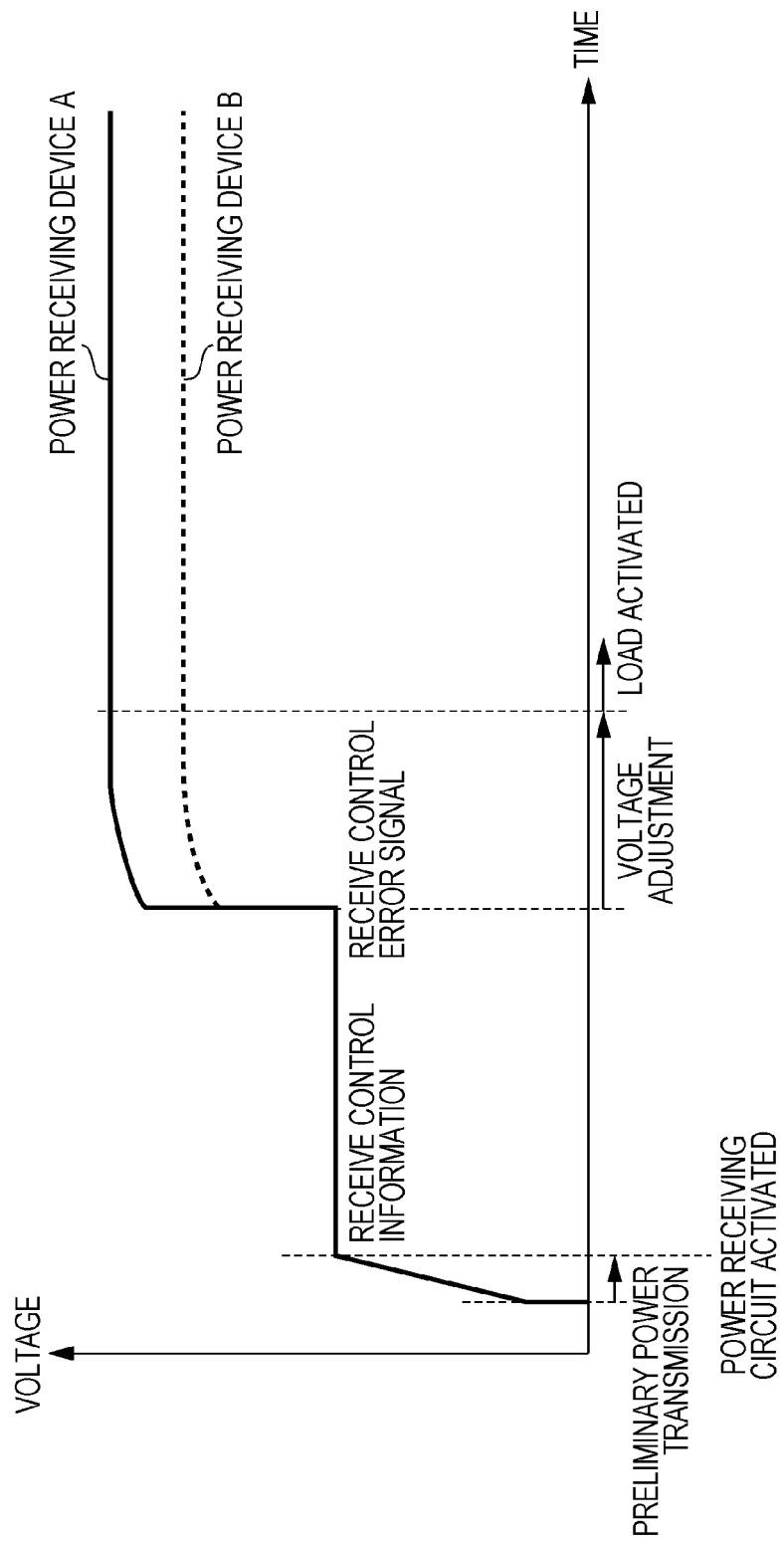
FIG. 19 is a diagram illustrating an example of startup control in the second embodiment.

FIG. 19 is a diagram illustrating an example of rise control in the present embodiment. After having received the control information, the power transmission control circuit 150 in the present embodiment transmits power that generates a voltage that does not match the requested voltage of the power receiving device 200 but close to the requested voltage. A fewer number of times of feedback control are performed, and the voltage is brought close to the target. Accordingly, even in a case where there is error in the control parameter determined based on the control information of the power receiving device 200, the requested voltage can be satisfied in a short amount of time.

Figure 20:
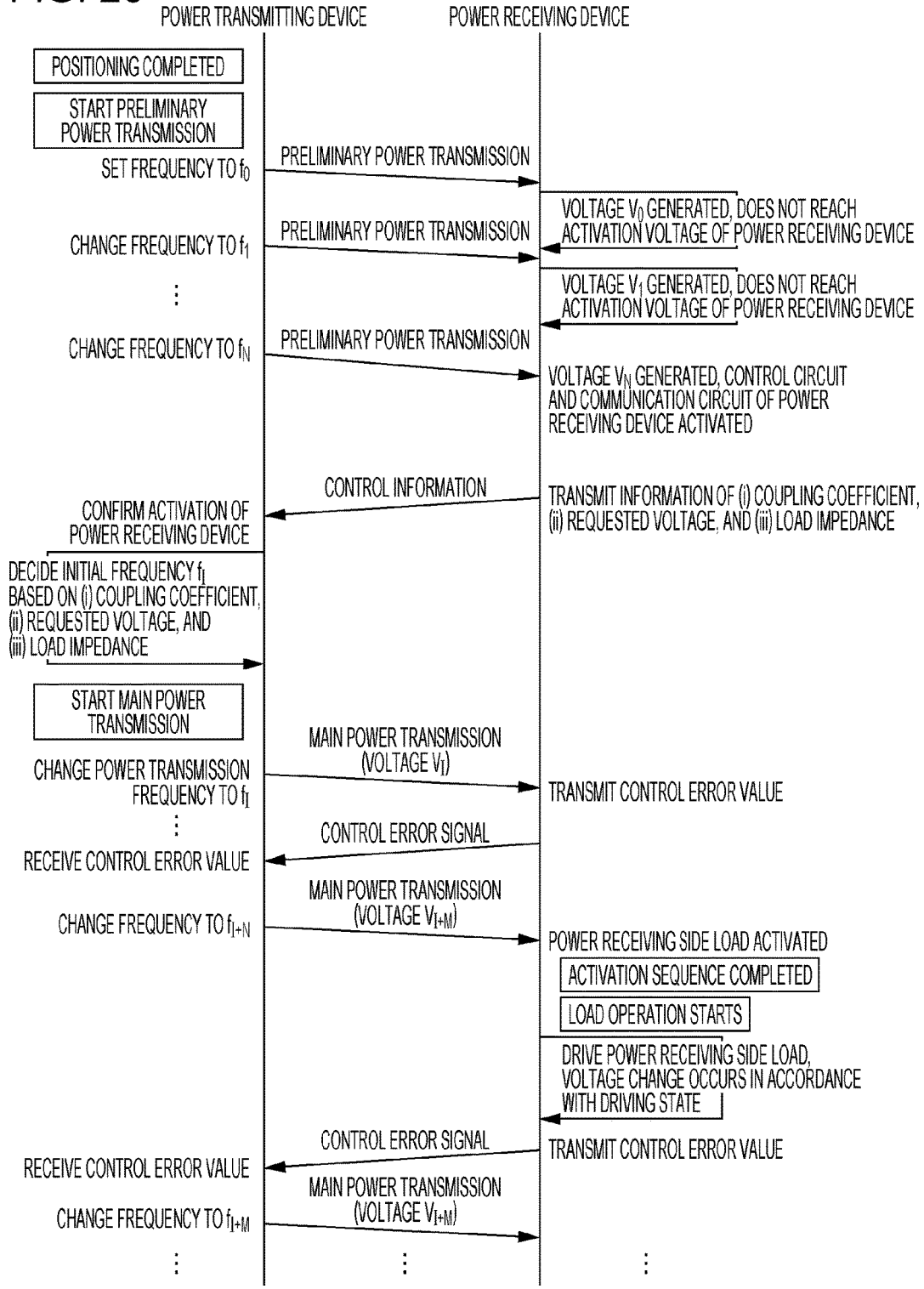
FIG. 20 is a sequence diagram illustrating operations when activating in the second embodiment.

FIG. 20 is a sequence diagram illustrating the operations at the time of activation in the present embodiment. The operations until main power transmission starts are the same as in the first embodiment. In the present embodiment, feedback control based on control error values is performed even after starting main power transmission. Accordingly, even if the control parameter value determined by referencing the table is slightly off of the ideal value, the deviation can be compensated for by the feedback control. FIG. 20 illustrates an example where the main power transmission has been started using a frequency $f_I$ that generates voltage close to the requested voltage of the power receiving device 200. After setting the initial frequency to $f_I$, feedback control is performed once or multiple times, and the load is activated at the point that the frequency reaches $f_{I+N}$. Operations after activating the load are the same as in the first embodiment.

Figure 21:
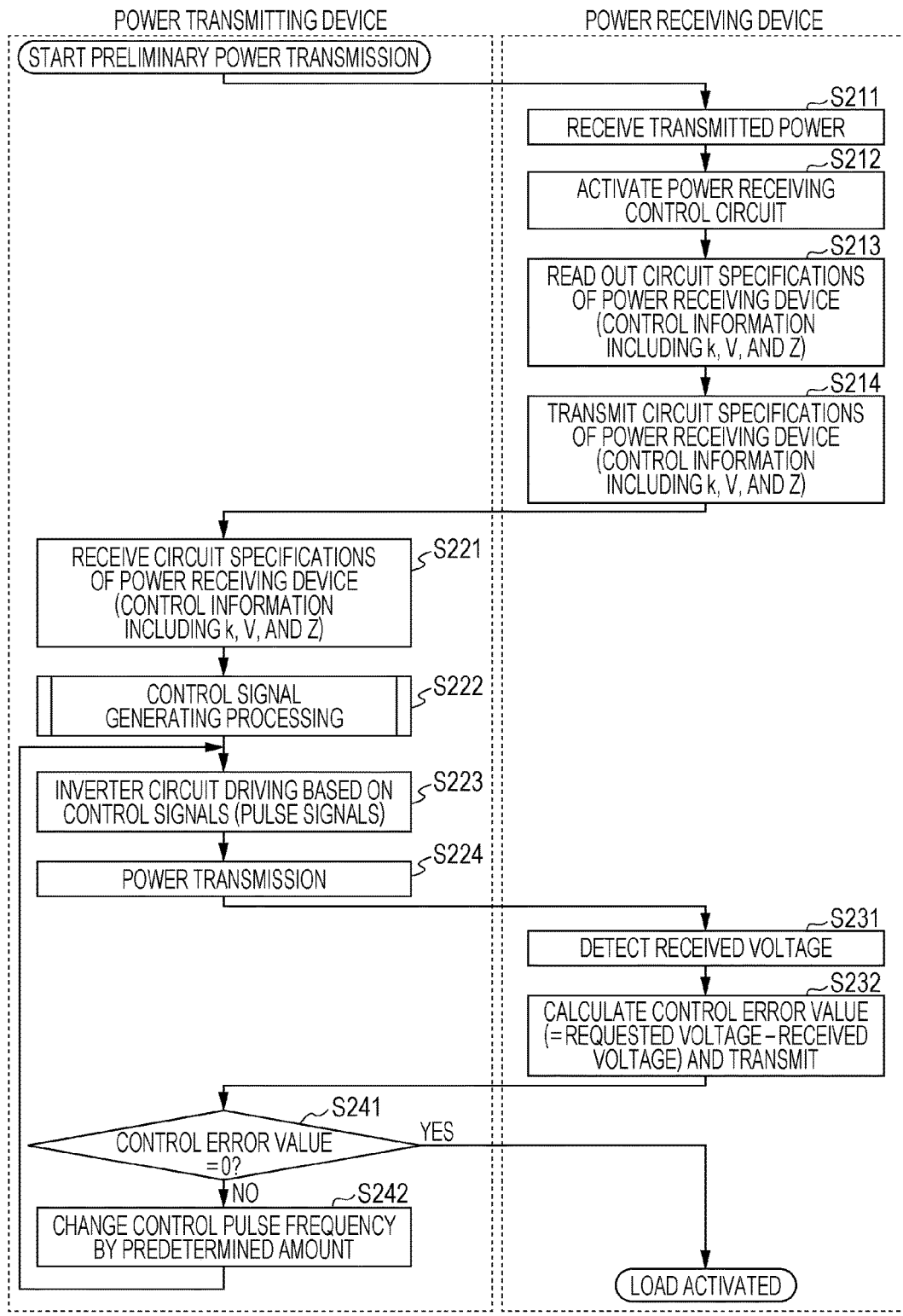
FIG. 21 is a flowchart illustrating the operations in FIG. 20 in greater detail.

FIG. 21 is a flowchart illustrating the operations in FIG. 20 in further detail. The operations of steps S211 through S221 are the same as the operations of steps S111 through S121 in FIG. 17. Step S222 is the same as steps S121 through S125 in FIG. 17. Steps S223 and S224 are the same as steps S126 and S127 in FIG. 17. However, the present embodiment starts main power transmission using a frequency $f_I$ that generates voltage deviated from the requested voltage of the power receiving device 200. Accordingly, in step S231, the power receiving control circuit 250 detects the received voltage (DC voltage after rectification) using a current-voltage detecting circuit 290 (step S231). The control error value that is the difference value between the requested voltage and the received voltage is calculated and transmitted (step S232). Upon having received the information of the control error value, the power transmission control circuit 150 determines whether or not the control error value is zero (step S241). In a case where the control error value is not zero, the frequency of the control pulse driving the inverter circuit 170 is changed by a predetermined amount (step S242). Thereafter, the operations of steps S223 through S242 are repeated until the control error value reaches zero. Once the control error value reaches zero, the load is activated.

Figure 22:
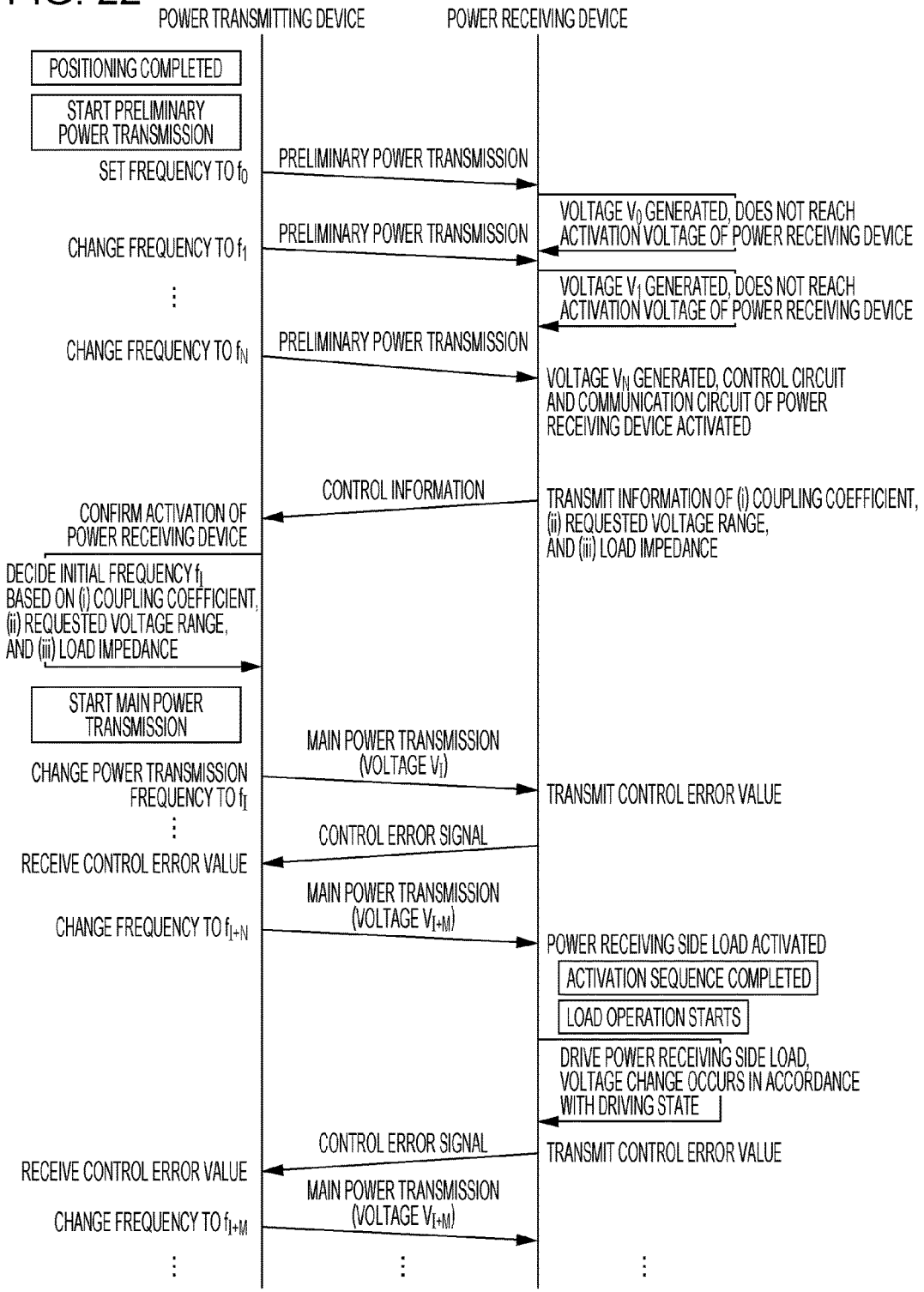
FIG. 22 is a sequence diagram illustrating operations at the time of activating in a case of transmitting power to a power receiving device illustrated in FIG. 18.

FIG. 22 is a sequence diagram illustrating operations of activation in a case of transmitting power to the power receiving device 200b illustrated in FIG. 18. The power receiving device 200b has the DC-DC converter 292, so the requested voltage is not a predetermined value, but a predetermined range (hereinafter referred to as "requested voltage range"). Accordingly, after activation, the power receiving control circuit 250 and receiving-side transmitter 280 transmit the information of the (i) coupling coefficient, (ii) requested voltage, and (iii) load impedance to the power transmitting device 100. The information of the requested voltage range may be information such as "5 V±1 V" or "4 V to 6 V". In this example, frequency information stored in the tables also is managed by range and not value. The power transmission control circuit 150 acquires information of a frequency range corresponding to the received coupling coefficient, requested voltage range, and load impedance, from the table, and determines the median frequency, for example, of the frequency range to be the initial frequency $f_I$. Feedback control based on the control error value is performed after starting main power transmission in the example in FIG. 22, as well. A control error value may be any of the following.

Figure 23:
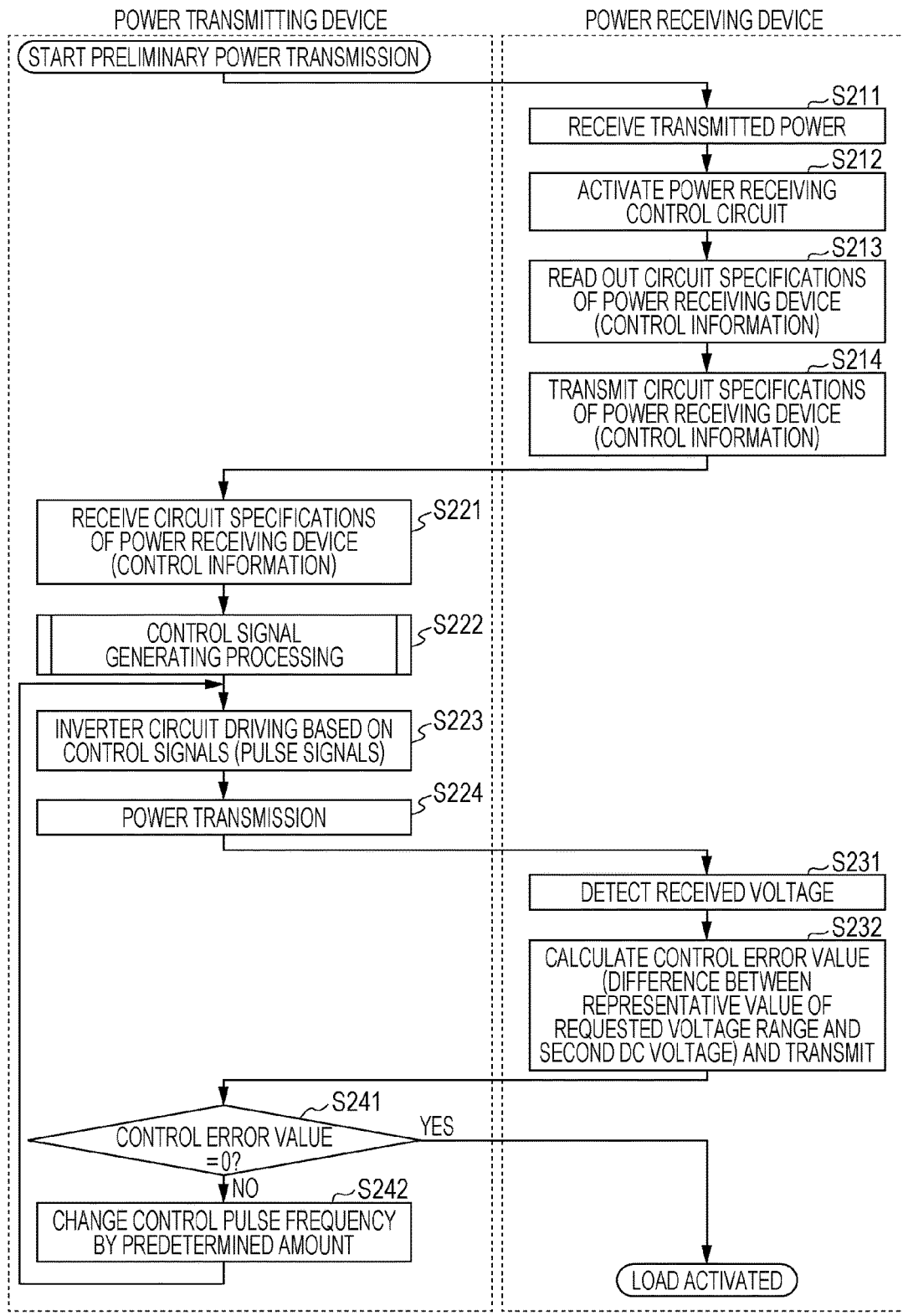
FIG. 23 is a flowchart illustrating the operations in FIG. 22 in greater detail.

(1) Control error value=median value of requested voltage range−current voltage value
(2) Control error value=upper limit value of requested voltage range−current voltage value
(3) Control error value=lower limit value of requested voltage range−current voltage value FIG. 23 is a flowchart illustrating the operations of FIG. 22 in further detail. Only the operations of step S222 and step S232 differ from the operations illustrated in FIG. 21.

Figure 24:
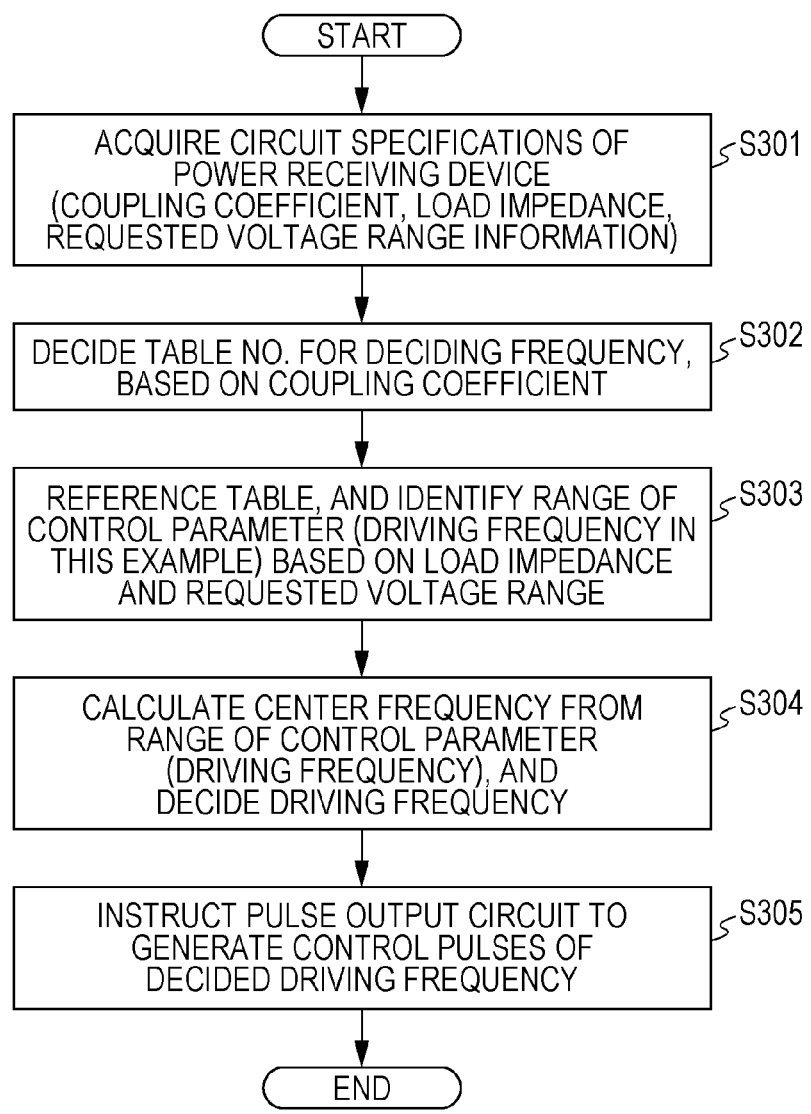
FIG. 24 is a flowchart illustrating the operations in step S222 in FIG. 22 in detail.

FIG. 24 is a flowchart illustrating the operations of S222 in further detail. The power transmission control circuit 150 acquires information of circuit specifications (coupling coefficient, load impedance, and requested voltage range) of the power receiving device 200 that the transmitting-side receiver 180 has received (step S301). Next, based on the coupling coefficient information, the table No. for determining the frequency corresponding to the coupling coefficient thereof is determined (step S302). The determined table is referenced, and the range of the control parameter (frequency in the present embodiment) corresponding to the combination of load impedance and requested voltage range is identified (step S303). Next, the median frequency, for example, is calculated from the identified frequency range, and the frequency $f_I$ is determined (step S304) The pulse output circuit 160 is instructed to generate control pulses of the determined frequency $f_I$ (step S305).

The difference value between a representative value of the requested voltage range and the second DC voltage is calculated as a control error value as described above, in step S232 in FIG. 23. A representative value may be one of a median value, upper limit value, and lower limit value.

In the present embodiment, the power receiving device 200b has the DC-DC converter 292, so the range of the requested voltage being requested to the power transmitting device 100 can be expanded beyond the range that the load 400 requests. For example, even if the range of voltage that the load 400 requests is 4 V to 6 V, the range of the requested voltage being requested to the power transmitting device 100 can be expanded to 4 V to 12 V. In this case, the DC-DC converter 292 can perform voltage conversion if the second DC voltage is 4 V to 12 V, so that the second DC voltage is in the range of 4 V to 6 V. The control parameter may be managed as information indicating a predetermined range instated of a predetermined value in this case.

Figure 25:
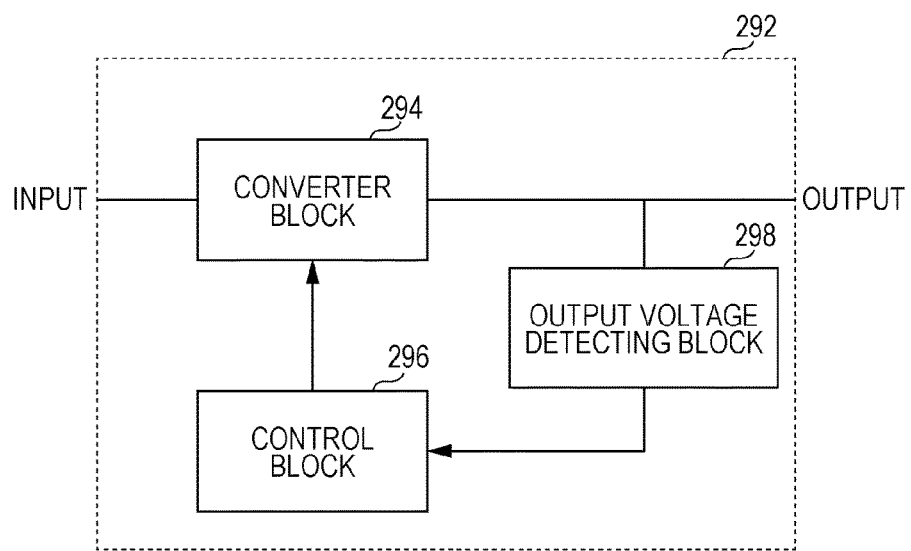
FIG. 25 is a block diagram illustrating a configuration example of a DC-DC converter.

FIG. 25 is a block diagram illustrating a configuration example of the DC-DC converter 292. The DC-DC converter 292 includes a converter block 294, a control block 296, and an output voltage detecting block 298.

Figure 26:
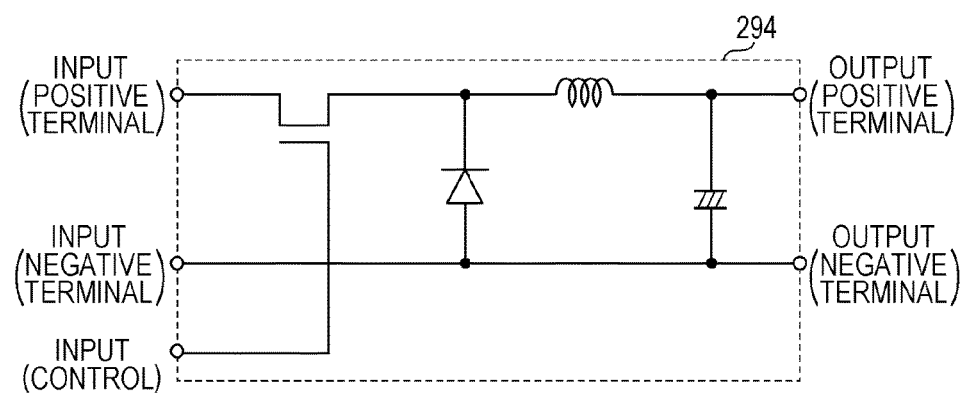
FIG. 26 is a diagram illustrating a circuit configuration example of a converter block.

FIG. 26 is a diagram illustrating a circuit configuration example of the converter block 294. While the illustrated DC-DC converter 292 is a single-transistor step-down DC-DC converter, a different circuit configuration may be used. The input voltage is larger than the output voltage in the illustrated example. the control block 296 performs feedback control where the switching duty ratio of the converter block 294 is changed while monitoring the output voltage detected by the output voltage detecting block 298.

As described above, in the present embodiment, the power transmission control circuit 150 performs adjustment to bring the amplitude of voltage of the received AC power (or voltage after rectification) to within a range of 80% to 120% of the requested voltage, for example, by adjusting the voltage of the AC power using a control parameter. Thereafter, the power receiving control circuit 250 and receiving-side transmitter 280 transmits error information to the power transmitting device 100. The power transmission control circuit 150 receives the error information and updates the control parameter. The error is reduced by repeating this operation, to converge the error at generally zero. In this way, after having brought the control parameter near to a value satisfying the requested voltage first, the power transmission control circuit 150 then adjusts the voltage amplitude and frequency of the AC power output from the inverter circuit 170 by repeating parameter updating. Thus, even in a case where there is error in the control parameter determined based on the control information from the power receiving device 200, the requested voltage can be satisfied in a short time.

Third Embodiment

Figure 27:
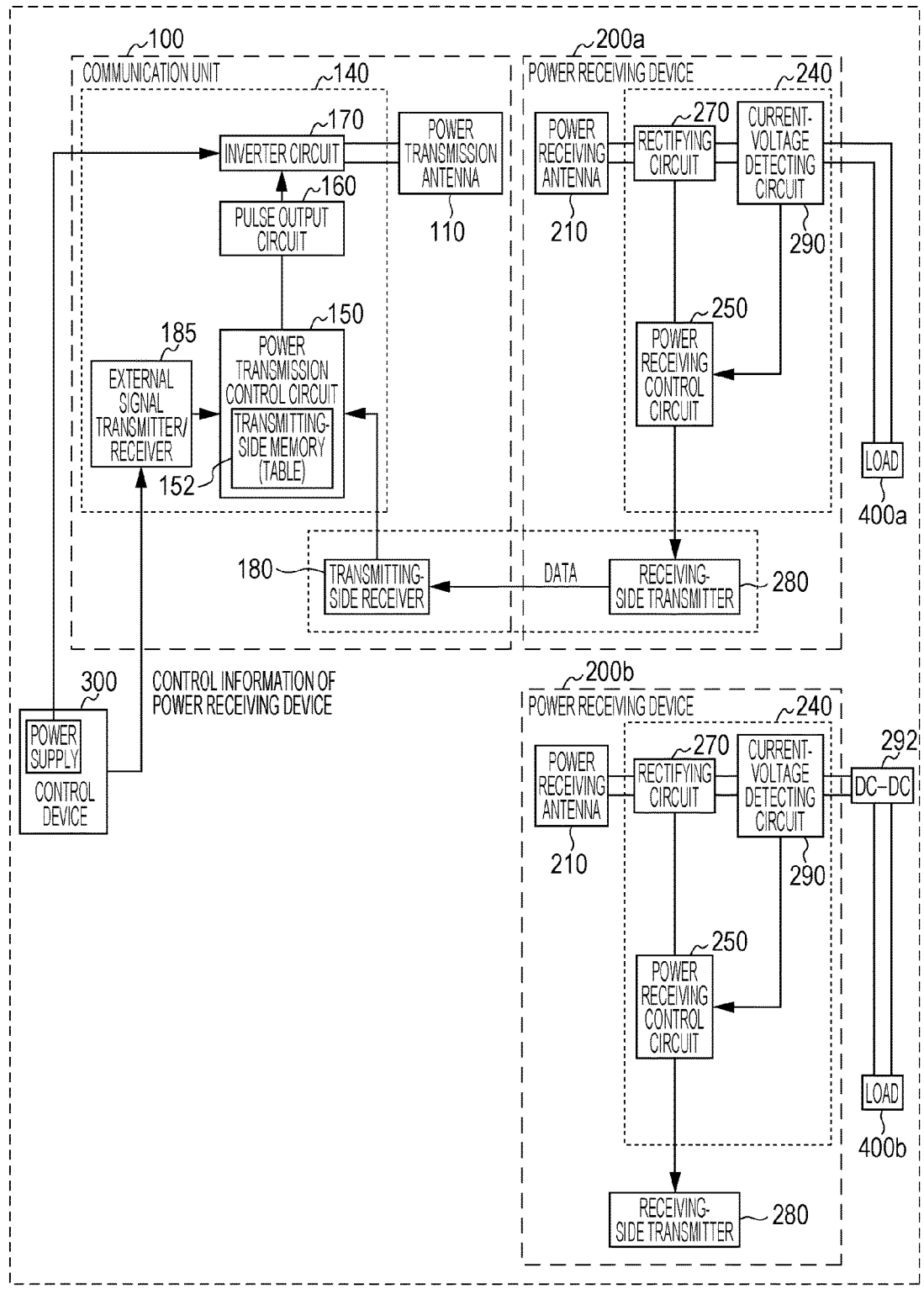
FIG. 27 is a block diagram illustrating the configuration of a wireless power transmission system according to a third embodiment.

FIG. 27 is a block diagram illustrating the configuration of the wireless power transmission system according to a third embodiment. The wireless power transmission system according to the third embodiment differs from the first and second embodiments in that a control device 300 having a power source is provided.

In the present embodiment, the control device 300 manages the control information of the power receiving device 200 including (i) the coupling coefficient between the power transmitting antenna 110 and power receiving antenna 210, (ii) requested voltage of the power receiving device 200, and (iii) load impedance of the load 400, instead of the power receiving device 200, and transmits to the power transmitting device 100. In a case where the power receiving device 200a is attached to the power transmitting device 100, the control information of the power receiving device 200a is transmitted to the power transmitting device 100. In a case where the power receiving device 200b is attached to the power transmitting device 100, the control information of the power receiving device 200b is transmitted to the power transmitting device 100. In a case where an unshown power receiving device is attached to the power transmitting device 100, the control information of that power receiving device is transmitted to the power transmitting device 100. The control information of each power receiving device 200 is stored in a recording medium in the control device 300 beforehand. The control device 300 inputs control information to an external signal transmitter/receiver 185, whereby the power transmitting device 100 can acquire control information before the power receiving device 200 activates. Accordingly, even quicker activation can be realized. Note that the external signal transmitter/receiver 185 in the power transmitting device 100 may be a circuit that performs wireless communication, or may be a circuit that acquires information from the control device 300 by cable.

The control device 300 has a DC power source, control circuit and communication circuit. The control circuit in the control device 300 has a processor such as a central processing unit (CPU) or the like, and memory. The processor executes a program stored in the memory, thereby executing the operations of the present embodiment. the control device 300 may be situated at a remote location from the power transmitting device 100 and power receiving device 200.

Voltage adjustment by feedback control may be performed in the present embodiment, in the same way as in the second embodiment. The power receiving device 200b may also perform voltage adjustment using the DC-DC converter 292. Note that the transformer (DC-DC converter) 292 in the present embodiment is provided externally from the power receiving device 200b. Thus, in a case of using the DC-DC converter 292, the DC-DC converter 292 does not need to be provided inside the power receiving device 200b. The power receiving device 200b can handle sudden change in voltage by being provided with the DC-DC converter 292.

Figure 28:
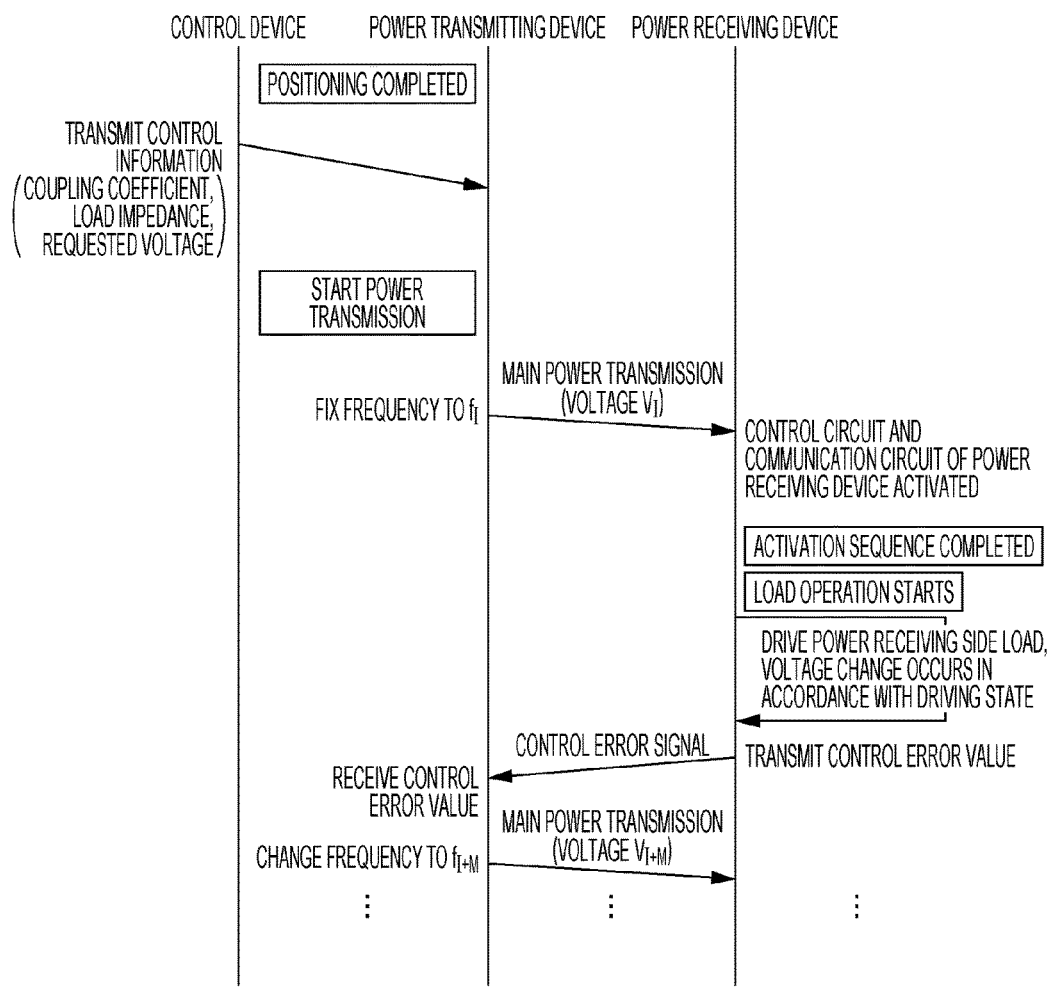
FIG. 28 is a sequence diagram illustrating operations when activating in a third embodiment.

FIG. 28 is a sequence diagram illustrating operations at the time of activation according to the present embodiment. In the present embodiment, upon positioning of the power transmitting device 100 and the power receiving device 200 being competed, the control circuit and communication circuit in the control device 300 transmit the control information of the power receiving device 200 to the power transmitting device 100. Thereupon, the power transmission control circuit 150 determines the control parameter (frequency in this example) value corresponding to the combination of coupling coefficient, load impedance, and requested voltage, that the control information indicates, by the same processing as in the first and second embodiments, and drives the inverter circuit 170 by that control parameter. Accordingly, the power receiving control circuit 250 and receiving-side transmitter 280 of the power receiving device 200 are activated, and the load also is activated. Thereafter, feedback control based on control error values is performed to handle fluctuation corresponding to the driving state of the load.

In the operation illustrated in FIG. 28, no feedback control is performed after the frequency $f_r$ is determined until the load is activated, but this feedback control may be performed, in the same way as in the second embodiment.

In the present embodiment, the power transmitting device 100 does not need to perform preliminary power transmission to activate the power receiving device 200, in order to obtain information of the power receiving device 200 from the control device 300. Power transmission is performed using the control parameter satisfying the requested voltage of the power receiving device 200, whereby operation of the load can be started immediately.

Figure 29:
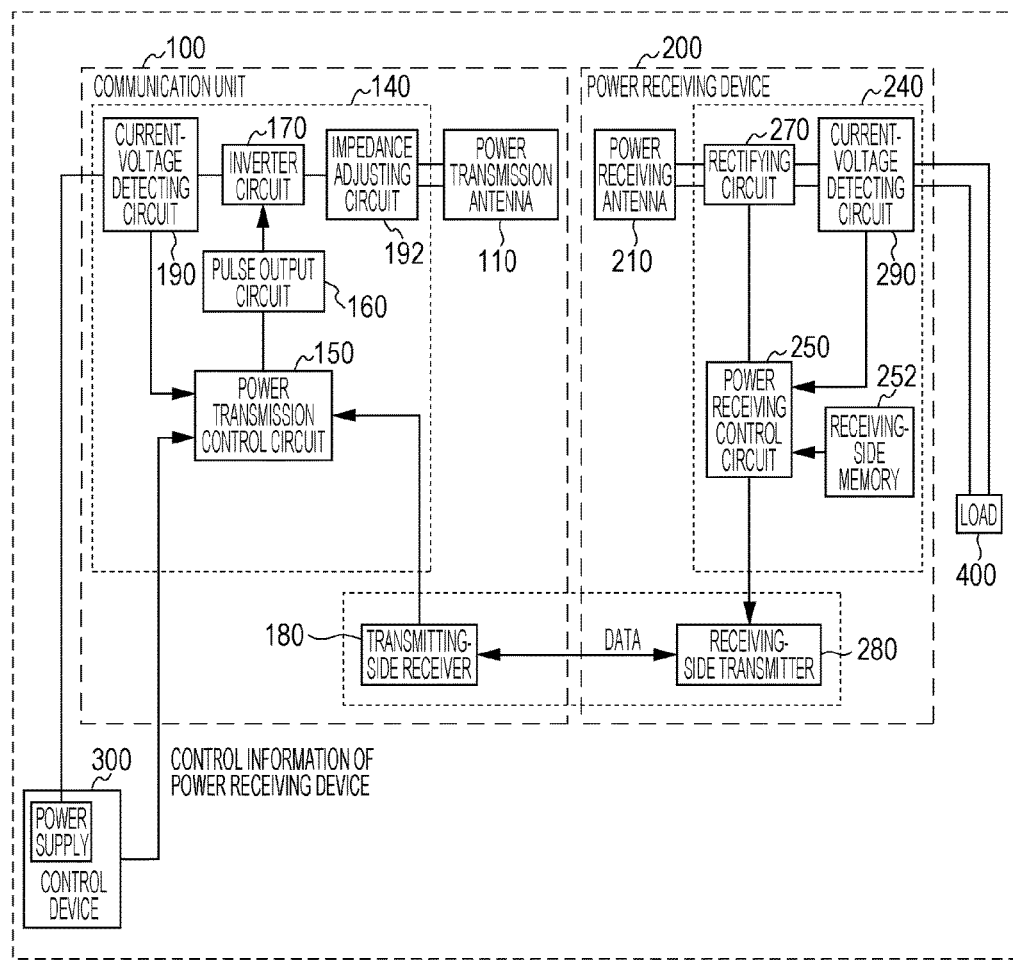
FIG. 29 is a diagram illustrating a modification of the third embodiment.

FIG. 29 is a diagram illustrating a modification of the present embodiment. In this modification, the power transmitting device 100 further has an impedance adjusting circuit 192 and a current-voltage detecting circuit 190. The impedance adjusting circuit 192 is connected between the inverter circuit 170 and the power transmitting antenna 110. The current-voltage detecting circuit 190 is connected between the power source and the inverter circuit 170. The impedance adjusting circuit 192 adjusts impedance by changing the inductance or capacitance connected to the power transmitting antenna 110. The power transmission control circuit 150 controls the impedance adjusting circuit 192 based on control information transmitted from the control device 300, and current and voltage detection values detected by the current-voltage detecting circuit 190. Accordingly, the impedance of the power transmitting circuit 140 can be adjusted, and impedance matching can be realized.

Note that in a case where the impedance adjustment is performed in the configuration according to the first embodiment or the second embodiment, the power transmission control circuit 150 controls the impedance adjusting circuit 192 based on control information acquired from the power receiving device 200.

As described above, the present disclosure includes the wireless power transmission system and transmission device according to the following items.

Item 1

A wireless power transmission system including:
  a power transmitting device including
    an inverter circuit that converts a first DC power supplied from a power source into AC power and outputs the AC power,
    a power transmitting antenna that wirelessly transmits the output AC power, and
    a power transmission control circuit that adjusts the voltage of the AC power output from the inverter circuit;
  a power receiving device including
    a power receiving antenna that receives the AC power transmitted from the power transmitting antenna, and
    a rectifying circuit that converts the received AC power into a second DC power; and
  a load into which the second DC power is input,
  wherein the power transmitting device and the power receiving device are capable of being coupled and detached,
  wherein the power receiving device further includes a receiving-side transmitter that transmits, to the power transmitting device, control information of the power receiving device including (i) a coupling coefficient between the power transmitting antenna and the power receiving antenna, (ii) requested voltage of the power receiving device, and (iii) load impedance of the load,
  wherein the power transmitting device further includes
    a transmitting-side receiver that receives the control information of the power receiving device from the receiving-side transmitter, and
    a table containing control parameters correlated with (i) the coupling coefficient, (ii) the requested voltage, and (iii) the load impedance,
  and wherein the power transmission control circuit
    causes the inverter circuit to output preliminary AC power to activate the power receiving device in a state where the power transmitting device and power receiving device are coupled,
    causes the transmitting-side receiver to receive the control information of the power receiving device from the power receiving device,
    determines the control parameter based on the control information by referring to the table, and
    adjusts the voltage and frequency of the AC power output from the inverter circuit using the control parameter.

According to this aspect, the power receiving device has a receiving-side transmitter that transmits, to the power transmitting device, control information of the power receiving device including (i) a coupling coefficient between the power transmitting antenna and the power receiving antenna, (ii) requested voltage of the power receiving device, and (iii) load impedance of the load, the power transmitting device has a transmitting-side receiver that receives the control information of the power receiving device from the receiving-side transmitter, and a table containing control parameters correlated with (i) the coupling coefficient, (ii) the requested voltage, and (iii) the load impedance, and the power transmission control circuit causes the power receiving device to be activated in a state where the power transmitting device and power receiving device are coupled, by causing the inverter circuit to output preliminary AC power to activate the power receiving device, causes the transmitting-side receiver to receive the control information of the power receiving device from the power receiving device that has been activated, determines the control parameter based on the control information by referring to the table, and adjusts the voltage and frequency of the AC power output from the inverter circuit using the control parameter.

Accordingly, time required to activate the load, which is necessary in a case of performing feedback control, can be reduced. Thus, the activation time after having exchanged a power receiving device can be reduced, and work efficiency can be improved.

Item 2

The wireless power transmission system according to Item 1, wherein the power transmission control circuit adjusts to match the voltage of the AC power to the requested voltage, by adjusting the voltage of the AC power using the control parameter.

Accordingly, the load can be activated without performing feedback control.

Item 3

The wireless power transmission system according to Item 1, wherein the power transmission control circuit adjusts to bring the voltage of the AC power close to a range of 80% to 120% of the requested voltage, by adjusting the voltage of the AC power using the control parameter.

Accordingly, the requested voltage can be satisfied with fewer times of performing feedback control.

Item 4

The wireless power transmission system according to Item 3, wherein, after the adjustment of the voltage of the AC power using the control parameter, the transmitting-side receiver receives error information indicating error between the voltage of the second DC power and the requested voltage from the receiving-side transmitter, and wherein the power transmission control circuit updates the control parameter to converge the error that the error information indicates, and adjusts the voltage and frequency of the AC power output from the inverter circuit using the updated control parameter.

Accordingly, the voltage of the AC power is brought close to a range of 80% to 120% of the requested voltage, and thereafter can be matched to the requested voltage.

Item 5

The wireless power transmission system according to any one of Items 1 through 4, wherein the requested voltage of the power receiving device is a value indicating a predetermined range.

Accordingly, it is sufficient to adjust the voltage of the AC power to a predetermined range rather than a particular value, so control is easier.

Item 6

The wireless power transmission system according to any one of Items 1 through 4, wherein the control parameter is a value indicating a predetermined range.

Item 7

The wireless power transmission system according to Item 6, wherein power transmission control circuit adjusts the voltage and frequency of the AC power output from the inverter circuit using a median value of the control parameter indicated by the predetermined range.

Item 8

The wireless power transmission system according to any one of Items 1 through 7, wherein the power transmitting device has a protrusion or a recess on a surface of the power transmitting device, wherein the power receiving device has a protrusion or a recess on a surface of the power receiving device, and wherein the power transmitting device and the power receiving device can be coupled and separated, by the protrusion of the power transmitting device and the recess of the power receiving device being engaged, or by the recess of the power transmitting device and the protrusion of the power receiving device being engaged.

Thus, the power transmitting device and power receiving device can be easily coupled and separated.

Item 9

The wireless power transmission system according to any one of Items 1 through 8, wherein the load is included in the power receiving device.

Item 10

The wireless power transmission system according to any one of Items 1 through 9, wherein the inverter circuit includes four switching devices, wherein the four switching devices make up a first switching device pair that outputs voltage of the same polarity as the voltage of the first DC power supplied from the power source when conducting, and a second switching device pair that outputs voltage of opposite polarity from the voltage of the first DC power supplied from the power source when conducting, wherein the power transmission control circuit supplies pulse signals to each of the four switching devices, to switch between conducting and non-conducting states, and adjusts the voltage of the AC power output from the inverter circuit, by adjusting a phase difference of two pulse signals supplied to the first switching device pair, and a phase difference of two pulse signals supplied to the second switching device pair, and wherein the control parameter is a value indicating the phase difference.

Accordingly, in a case of using a full-bridge inverter circuit, the voltage of the AC power can be adjusted by adjusting the phase difference.

Item 11

The wireless power transmission system according to any one of Items 1 through 9, wherein the power transmission control circuit adjusts the frequency of the AC power output from the inverter circuit, in which the control parameter is a value representing the frequency.

Accordingly, the frequency of the AC power can be adjusted by adjusting the frequency.

Item 12

The wireless power transmission system according to any one of Items 1 through 9, wherein the inverter circuit includes a plurality of switching devices, wherein the power transmission control circuit supplies pulse signals to each of the plurality of switching devices, to switch between conducting and non-conducting states, wherein the voltage of the AC power output from the inverter circuit is adjusted by adjusting a duty ratio of the pulse signals, and wherein the control parameter is a value representing a duty ratio.

Accordingly, the voltage of the AC power can be adjusted by adjusting the duty ratio.

Item 13

A wireless power transmission system comprising:

a power transmitting device including an inverter circuit that converts a first DC power supplied from a power source into AC power and outputs the AC power, a power transmitting antenna that wirelessly transmits the output AC power, and a power transmission control circuit that adjusts the voltage of the AC power output from the inverter circuit;

a power receiving device including a power receiving antenna that receives the AC power transmitted from the power transmitting antenna, and a rectifying circuit that converts the received AC power into a second DC power;

a load into which the second DC power is input; and a control device including the power source, wherein the power transmitting device and the power receiving device are capable of being coupled and detached, wherein the control device transmits, to the power transmitting device, control information of the power receiving device including (i) a coupling coefficient between the power transmitting antenna and the power receiving antenna, (ii) requested voltage of the power receiving device, and (iii) load impedance of the load, wherein the power transmitting device further has a transmitting-side receiver that receives the control information of the power receiving device from the control device, and a table containing control parameters correlated with (i) the coupling coefficient, (ii) the requested voltage, and (iii) the load impedance, and wherein the power transmission control circuit determines the control parameter based on the control information by referring to the table, adjusts the voltage of the AC power output from the inverter circuit using the control parameter, and in a state where the power transmitting device and the power receiving device are coupled, outputs AC power for activating the power receiving device and the load to the inverter circuit, and activates the power receiving device and the load.

According to this aspect, the control device provided externally from the power transmitting device and power receiving device transmits, to the power transmitting device, control information of the power receiving device including (i) a coupling coefficient between the power transmitting antenna and the power receiving antenna, (ii) requested voltage of the power receiving device, and (iii) load impedance of the load.

Accordingly, the power transmitting device can acquire control information of the power receiving device, regardless of whether or not the power receiving device is activated. Thus, the time required for activation of the load can be reduced even further.

Item 14

The wireless power transmission system according to Item 13, wherein the power transmission control circuit adjusts to match the voltage of the AC power to the requested voltage, by adjusting the voltage of the AC power using the control parameter.

Accordingly, the load can be activated without performing feedback control.

Item 15

The wireless power transmission system according to Item 13, wherein the power transmission control circuit adjusts to bring the voltage of the AC power close to a range of 80% to 120% of the requested voltage, by adjusting the voltage of the AC power using the control parameter.

Accordingly, the requested voltage can be satisfied with fewer times of performing feedback control.

Item 16

The wireless power transmission system according to Item 15, wherein, after the adjustment of the voltage of the AC power using the control parameter, the transmitting-side receiver receives error information indicating error between the voltage of the second DC power and the requested voltage from the receiving-side transmitter, and wherein the power transmission control circuit updates the control parameter to converge the error that the error information indicates, and adjusts the voltage and frequency of the AC power output from the inverter circuit using the updated control parameter.

Accordingly, the voltage of the AC power is brought close to a range of 80% to 120% of the requested voltage, and thereafter can be matched to the requested voltage.

Item 17

The wireless power transmission system according to any one of Items 13 through 16, wherein the requested voltage of the power receiving device is a value indicating a predetermined range.

Accordingly, it is sufficient to adjust the voltage of the AC power to a predetermined range rather than a particular value, so control is easier.

Item 18

The wireless power transmission system according to any one of Items 13 through 16, wherein the control parameter is a value indicating a predetermined range.

Item 19

The wireless power transmission system according to Item 18, wherein the power transmission control circuit 150 adjusts the voltage and frequency of the AC power output from the inverter circuit using a median value of the control parameter indicated by the predetermined range.

Item 20

The wireless power transmission system according to any one of Items 13 through 19, wherein the power transmitting device has a protrusion or a recess on a surface of the power transmitting device, wherein the power receiving device has a protrusion or a recess on a surface of the power receiving device, and wherein the power transmitting device and the power receiving device can be coupled and separated, by the protrusion of the power transmitting device and the recess of the power receiving device being engaged, or by the recess of the power transmitting device and the protrusion of the power receiving device being engaged.

Thus, the power transmitting device and power receiving device can be easily coupled and separated.

Item 21

The wireless power transmission system according to any one of Items 13 through 20, wherein the load is included in the power receiving device.

Item 22

The wireless power transmission system according to any one of Items 13 through 21, wherein the inverter circuit includes four switching devices, wherein the four switching devices make up a first switching device pair that outputs voltage of the same polarity as the voltage of the first DC power supplied from the power source when conducting, and a second switching device pair that outputs voltage of opposite polarity from the voltage of the first DC power supplied from the power source when conducting, wherein the power transmission control circuit supplies pulse signals to each of the four switching devices, to switch between conducting and non-conducting states, and adjusts the voltage of the AC power output from the inverter circuit, by adjusting a phase difference of two pulse signals supplied to the first switching device pair, and a phase difference of two pulse signals supplied to the second switching device pair, and wherein the control parameter is a value indicating the phase difference.

Accordingly, in a case of using a full-bridge inverter circuit, the voltage of the AC power can be adjusted by adjusting the phase difference.

Item 23

The wireless power transmission system according to any one of Items 13 through 21, wherein the power transmission control circuit adjusts the frequency of the AC power output from the inverter circuit, in which the control parameter is a value representing the frequency.

Accordingly, the voltage of the AC power can be adjusted by adjusting the frequency.

Item 24

The wireless power transmission system according to any one of Items 13 through 21, wherein the inverter circuit includes a plurality of switching devices.

wherein the power transmission control circuit supplies pulse signals to each of the plurality of switching devices, to switch between conducting and non-conducting states, wherein the voltage of the AC power output from the inverter circuit is adjusted by adjusting a duty ratio of the pulse signals, and wherein the control parameter is a value representing a duty ratio.

The present technology is applicable to devices which require data transmission along with power supply, such as surveillance cameras, robots, and so forth, for example.

What is claimed is:

1. A wireless power transmission system comprising:
a power transmitting device including
an inverter circuit that converts a first DC power supplied from a power source into AC power and outputs the AC power,
a power transmitting antenna that wirelessly transmits the output AC power, and
a power transmission control circuit that adjusts voltage and frequency of the AC power output from the inverter circuit;
a power receiving device including
a power receiving antenna that receives the AC power transmitted from the power transmitting antenna, and
a rectifying circuit that converts the received AC power into a second DC power; and
a load into which the second DC power is input,
wherein the power transmitting device and the power receiving device are capable of being coupled and detached,
wherein the power receiving device further includes a receiving-side transmitter that transmits, to the power transmitting device, control information of the power receiving device including (i) a coupling coefficient between the power transmitting antenna and the power receiving antenna, (ii) requested voltage of the load of the power receiving device, and (iii) load impedance of the load,
wherein the power transmitting device further includes
a transmitting-side receiver that receives the control information of the power receiving device from the receiving-side transmitter, and
a table containing control parameters correlated with (i) the coupling coefficient, (ii) the requested voltage, and (iii) the load impedance,
and wherein the power transmission control circuit initially:
causes the inverter circuit to output preliminary AC power to activate the receiving-side transmitter of the power receiving device in a state where the power transmitting device and power receiving device are coupled, the preliminary AC power being lower than a power to activate the load of the power receiving device,
causes the transmitting-side receiver to receive the control information of the power receiving device from the power receiving device during the inverter circuit outputting the preliminary AC power,
determines the control parameter based on the control information by referring to the table, and
adjusts the voltage of the AC power output from the inverter circuit using the control parameter,
after the power transmission control circuit has adjusted the voltage of the AC power output from the inverter circuit using the control parameter, the power receiving device creates and transmits, to the power transmitting device via the receiving-side transmitter, control error signals representing a difference between a requested voltage value of the load and a current voltage value of the load, and the power transmission control circuit adjusts the voltage of the AC power output from the inverter circuit using the control error signals in order to output the power to activate the load.

2. The wireless power transmission system according to claim 1,
wherein the power transmission control circuit
adjusts to match the voltage of the AC power to the requested voltage, by adjusting the voltage of the AC power using the control parameter.

3. The wireless power transmission system according to claim 1,
wherein the power transmission control circuit
adjusts to bring the voltage of the AC power close to a range of 80% to 120% of the requested voltage, by adjusting the voltage of the AC power using the control parameter.

4. The wireless power transmission system according to claim 3,
wherein the power transmission control circuit updates the control parameter to converge the difference that the control error signals represent, and adjusts the voltage and frequency of the AC power output from the inverter circuit using the updated control parameter.

5. The wireless power transmission system according to claim 1,
wherein the requested voltage of the power receiving device is a value indicating a predetermined range.

6. The wireless power transmission system according to claim 1,
wherein the control parameter is a value indicating a predetermined range.

7. The wireless power transmission system according to claim 6,
wherein the power transmission control circuit adjusts the voltage and frequency of the AC power output from the inverter circuit using a median value of the control parameter indicated by the predetermined range.

8. The wireless power transmission system according to claim 1,
wherein the power transmitting device includes a protrusion or a recess on a surface of the power transmitting device,
wherein the power receiving device includes a protrusion or a recess on a surface of the power receiving device,
and wherein the power transmitting device and the power receiving device can be coupled and separated, by the protrusion of the power transmitting device and the recess of the power receiving device being engaged, or by the recess of the power transmitting device and the protrusion of the power receiving device being engaged.

9. The wireless power transmission system according to claim 1,
wherein the load is included in the power receiving device.

10. The wireless power transmission system according to claim 1,
wherein the inverter circuit includes four switching devices,
wherein the four switching devices make up a first switching device pair that outputs voltage of the same polarity as the voltage of the first DC power supplied from the power source when conducting, and a second switching device pair that outputs voltage of opposite polarity from the voltage of the first DC power supplied from the power source when conducting,
wherein the power transmission control circuit
supplies pulse signals to each of the four switching devices, to switch between conducting and non-conducting states, and
adjusts the voltage of the AC power output from the inverter circuit, by adjusting a phase difference of two pulse signals supplied to the first switching device pair, and a phase difference of two pulse signals supplied to the second switching device pair,
and wherein the control parameter is a value indicating the phase difference.

11. The wireless power transmission system according to claim 1,
wherein the power transmission control circuit adjusts the voltage of the AC power output from the inverter circuit in which the control parameter is a value representing the frequency.

12. The wireless power transmission system according to claim 1,
wherein the inverter circuit includes a plurality of switching devices,
wherein the power transmission control circuit supplies pulse signals to each of the plurality of switching devices, to switch between conducting and non-conducting states,
wherein the voltage of the AC power output from the inverter circuit is adjusted by adjusting a duty ratio of the pulse signals,
and wherein the control parameter is a value representing a duty ratio.

* * * * *